(12) United States Patent
Miyata

(10) Patent No.: US 10,706,401 B2
(45) Date of Patent: Jul. 7, 2020

(54) INFORMATION PROCESSING APPARATUS, INFORMATION PROCESSING METHOD, NON-TRANSITORY COMPUTER READABLE MEDIUM STORING PROGRAM, ELECTRONIC RECEIPT SYSTEM, AND TERMINAL DEVICE

(71) Applicant: NEC Platforms, Ltd., Kawasaki-shi, Kanagawa (JP)

(72) Inventor: Kotaro Miyata, Kanagawa (JP)

(73) Assignee: NEC Platforms, Ltd., Kawasaki-shi, Kanagawa (JP)

( * ) Notice: Subject to any disclaimer, the term of this patent is extended or adjusted under 35 U.S.C. 154(b) by 72 days.

(21) Appl. No.: 16/095,481

(22) PCT Filed: Apr. 10, 2017

(86) PCT No.: PCT/JP2017/014660
§ 371 (c)(1),
(2) Date: Oct. 22, 2018

(87) PCT Pub. No.: WO2017/183503
PCT Pub. Date: Oct. 26, 2017

(65) Prior Publication Data
US 2019/0095897 A1 Mar. 28, 2019

(30) Foreign Application Priority Data
Apr. 22, 2016 (JP) .................. 2016-086053

(51) Int. Cl.
*G06Q 20/20* (2012.01)
*G06Q 10/08* (2012.01)
(Continued)

(52) U.S. Cl.
CPC ........... *G06Q 20/209* (2013.01); *G06Q 10/04* (2013.01); *G06Q 10/087* (2013.01);
(Continued)

(58) Field of Classification Search
CPC ...... G06Q 20/20; G06Q 50/10; G06Q 20/208; G06Q 30/0601; G06Q 50/30; G06Q 10/04; G06Q 10/087; G06Q 20/209
(Continued)

(56) References Cited

U.S. PATENT DOCUMENTS 6,580,440 B1 * 6/2003 Wagner .................. G06F 9/451
715/762
7,487,912 B2 * 2/2009 Seifert ............... G06Q 20/0453
235/380

(Continued)

FOREIGN PATENT DOCUMENTS

JP 2002-167017 A 6/2002
JP 2003-276848 A 10/2003
(Continued)

OTHER PUBLICATIONS

International Search Report for PCT/JP2017/014660 dated, Jun. 27, 2017 (PCT/ISA/210).

*Primary Examiner* — Andrew Joseph Rudy
(74) *Attorney, Agent, or Firm* — Sughrue Mion, PLLC

(57) ABSTRACT

An electronic receipt system includes a mobile terminal in possession of a customer, a POS (Point of Sales) device installed at a store and an electronic receipt center on a cloud. When the POS device generates, as a digitized electronic receipt, receipt information on purchased merchandise purchased by a customer at the store, the POS device acquires information indicating a weight of the purchased merchandise, generates the electronic receipt in a format in which the information indicating the weight of the purchased merchandise is further added, transmits the electronic receipt to the electronic receipt center. The electronic receipt center stores the received electronic receipt and, upon receiving a transmission request from the mobile terminal, transmits the electronic receipt to the mobile (Continued)

terminal that has made the request. Upon receiving the electronic receipt, the mobile terminal provides a screen display of the information indicating the weight of the purchased merchandise.

10 Claims, 27 Drawing Sheets

(51) Int. Cl.
  *G06Q 30/06* (2012.01)
  *G06Q 20/04* (2012.01)
  *G06Q 20/32* (2012.01)
  *G06Q 50/10* (2012.01)
  *G07G 1/00* (2006.01)
  *G06Q 10/04* (2012.01)
  *G06Q 50/30* (2012.01)

(52) U.S. Cl.
  CPC ....... *G06Q 20/0453* (2013.01); *G06Q 20/208* (2013.01); *G06Q 20/322* (2013.01); *G06Q 30/0601* (2013.01); *G06Q 50/10* (2013.01); *G06Q 50/30* (2013.01); *G07G 1/0072* (2013.01)

(58) Field of Classification Search
  USPC ............ 705/14.1, 21–24, 26.1; 235/377–385
  See application file for complete search history.

(56) References Cited

U.S. PATENT DOCUMENTS

| | | | | |
|---|---|---|---|---|
| 8,019,643 | B2* | 9/2011 | Lore | G06Q 10/06375 |
| | | | | 705/14.1 |
| 8,606,642 | B2* | 12/2013 | Siounis | G06Q 30/0643 |
| | | | | 705/26.1 |
| 9,117,247 | B2* | 8/2015 | Lieberman | G06Q 40/123 |
| 10,002,337 | B2* | 6/2018 | Siddique | G06Q 10/0637 |
| 10,229,405 | B2* | 3/2019 | Gotanda | G06Q 20/0453 |
| 2004/0064373 | A1* | 4/2004 | Shannon | G06Q 20/0453 |
| | | | | 705/24 |
| 2010/0241521 | A1* | 9/2010 | Lindahl | G06Q 20/20 |
| | | | | 705/21 |
| 2014/0351265 | A1 | 11/2014 | Beaurepaire et al. | |

FOREIGN PATENT DOCUMENTS

| | | |
|---|---|---|
| JP | 2011-90375 A | 5/2011 |
| JP | 2011-524051 A | 8/2011 |
| JP | 2016-53844 A | 4/2016 |

\* cited by examiner

Fig. 5

| NAME OF STORE 401 | DATE OF PURCHASE 402 | TIME OF PURCHASE 403 | NAME OF MERCHANDISE 404 | UNIT PRICE 405 | UNIT WEIGHT 406 |
|---|---|---|---|---|---|
| C COMPANY STORE | 2016/1/26 | 9:51 | MERCHANDISE 1 | 1,980 | 175 |
| | | | | 1,980 | 175 |
| | | | | 1,980 | 175 |
| | | | | 1,980 | 175 |
| | | | MERCHANDISE 2 | 1,980 | 175 |
| | | | | 479 | 130 |
| | | | | 479 | 130 |
| | | | | 479 | 130 |
| | | | | 479 | 130 |
| | | | | 479 | 130 |
| | | | | 479 | 130 |
| | | | | 479 | 130 |
| | | | | 479 | 130 |
| | | | MERCHANDISE 3 | 455 | 230 |
| | | | MERCHANDISE 4 | 138 | 640 |
| TOTAL | | | | 15,283 | 3,045 |
| D COMPANY STORE | 2016/1/21 | 15:40 | ****** | ****** | ****** |
| | | | ****** | ****** | ****** |
| | | | ****** | ****** | ****** |
| | | | ****** | ****** | ****** |
| TOTAL | | | | | |
| F COMPANY STORE | 2016/1/24 | 21:40 | ****** | ****** | ****** |

| THREE DIMENSIONS COMBINED | SIZE | TOTAL WEIGHT |
|---|---|---|
| MAX OF 115 CM (45 IN) | W55cm×H40cm×D25cm<br>MAX OF (W 22 IN × H 16 IN × D 10 IN) | MAX OF 10 KG (22 LB) |

| BOARDING CLASS | FREE CHECK-IN BAGGAGE ALLOWANCE | NUMBER OF PIECES | WEIGHT PER PIECE | THREE DIMENSIONS (DEPTH/WIDTH/HEIGHT) COMBINED |
|---|---|---|---|---|
| FIRST CLASS | 32kg 70LB / 32kg 70LB / 32kg 70LB | 3 | 32kg/PIECE | A+B+C≦203cm ※INCLUDING CASTER AND HANDLE |
| BUSINESS CLASS | | | | |
| PREMIUM ECONOMY CLASS | 23kg 50LB / 23kg 50LB | 2 | 23kg/PIECE | |
| ECONOMY CLASS | | | | |

Fig. 16

INFORMATION PROCESSING APPARATUS, INFORMATION PROCESSING METHOD, NON-TRANSITORY COMPUTER READABLE MEDIUM STORING PROGRAM, ELECTRONIC RECEIPT SYSTEM, AND TERMINAL DEVICE

CROSS REFERENCE TO RELATED APPLICATIONS

This application is a National Stage of International Application No. PCT/JP2017/014660 filed Apr. 10, 2017, claiming priority based on Japanese Patent Application No. 2016-086053 filed Apr. 22, 2016, the disclosure of which is incorporated herein in its entirety by reference.

TECHNICAL FIELD

The present disclosure relates to information processing apparatuses, electronic receipt systems, mobile terminals, baggage weight checking methods, and baggage weight checking programs and relates, in particular, to an information processing apparatus, an electronic receipt system, a mobile terminal, a baggage weight checking method, and a baggage weight checking program that allow a customer who is to board an airplane to grasp a total weight of purchased merchandise purchased by the customer.

BACKGROUND ART

To date, receipts and other types of records of commercial transactions are issued in a paper format. However, with the development of electronic commerce, many of the receipts for online commercial transactions are being issued in the form of digitized electronic receipts.

Meanwhile, when a person procures merchandise overseas or purchases souvenirs during overseas travel, that person may encounter an unexpected trouble during the procedures for boarding an airplane if the person has purchased a large amount of merchandise. Typically, purchased merchandise is taken back to a hotel and repacked into a suitcase, a bag, or the like. Thus, whether the purchased merchandise can be stored into the suitcase or the bag can be checked visually on the spot.

However, the weight of the purchased merchandise cannot be measured without a scale. Therefore, for example, when a large number of small-volume cosmetic items or the like are purchased, even if the dimensions of the carry-on baggage meet the limit, a situation may occur in which the weight of the baggage is over the weight limit set by an airplane baggage allowance guideline and is not allowed to be carried into the cabin, or the weight of the baggage may be over the weight limit of free check-in baggage to be loaded into the cargo compartment of the airplane, thereby incurring an excess fee. In the worst case, the weight of the baggage may be over the maximum weight limit of check-in baggage.

In other words, when a large amount of purchased merchandise is to be brought back by an airplane, if the weight of the baggage is over the weight limit of an airplane baggage allowance guideline such as the one illustrated in FIG. 15 or FIG. 16, an excess fee may be incurred, or the baggage may not be allowed to be loaded into the airplane. FIG. 15 illustrates the content of the guideline for baggage to be carried into an airplane cabin and indicates the size and the total weight of baggage that can be carried into the cabin. FIG. 16 illustrates the content of the guideline for baggage to be checked into a cargo compartment of the airplane and indicates the upper limits of the number of pieces, the size, the volume, and the weight of baggage that can be checked in and the excess fees to be incurred when the baggage exceeds these limits.

When the total weight of the purchased merchandise is not known, a passenger may need to pay an excess fee during the procedures for boarding an airplane due to a slight weight difference. Alternatively, when a large amount of merchandise has been purchased, a passenger may need to go through the boarding procedures while being unsure of whether all the purchased merchandise is there and may find that all the merchandise has not been brought back only after arriving home. To prevent such a situation, for example, Published Japanese Translation of PCT International Publication for Patent Application, No. 2011-524051 of Patent Literature 1, titled "payment receipt processing method and system using receipt store," discloses a technique that, for example in a case of travelling in Japan, makes it possible to grasp all the items purchased after arriving in Japan with the use of an electronic receipt system. Specifically, the technique described in Patent Literature 1 provides such a system as described below.

First, upon an electronic receipt for purchased merchandise being generated on the basis of a commercial transaction, the electronic receipt is transmitted to a server, or a receipt store, on the cloud. The receipt store, serving as a cloud service, can provide a customer with a variety of services related to electronic receipts. For example, the customer can access an electronic receipt for that customer by accessing the receipt store on the cloud and acquire various pieces of information on purchased merchandise.

In addition, for example, in a case of a commercial establishment, such as a retail store or a hotel, a system for carrying out a commercial transaction can be configured with the use of a point of sales (POS) component, such as a cash register, connected to a device reader. The customer carries a customer device that stores a profile of that customer. The profile includes payment information, such as a credit card number, other account number, or electronic money, and can further include information on a contact address that indicates the location of a receipt store to which an electronic receipt for the customer is to be transmitted. The device reader can read out profile information from the customer device. As a result, the POS component or the device reader can transmit the electronic receipt for the customer to the receipt store specified in the customer's profile.

The electronic receipt can be transmitted in a variety of ways. For example, instead of transmitting the electronic receipt from the POS component or the device reader, as another option, in a case in which the device reader is capable of bidirectional communication with the customer device, the device reader may transmit the electronic receipt generated at the time of a commercial transaction to the customer device, and the customer device may store a copy of the electronic receipt into the customer device and also transmit the electronic receipt to the receipt store on the cloud.

The electronic receipt can include any level of details regarding the commercial transaction. For example, in a certain credit card commercial transaction, details at an item-by-item level in the commercial transaction are provided to the credit card issuer, and the availability of this data is utilized to provide the customer with a highly detailed receipt. In such a case, the customer can access this detailed level of details via the receipt store thereafter.

FIG. 17 is a system configuration diagram of an electronic receipt system described in Patent Literature 1 described above as a system configuration example in which an electronic receipt can be generated and transmitted to a receipt store. An electronic receipt system 100 illustrated in FIG. 17 includes a device reader 106 and a Point of Sales (POS) component 110 that are installed at a physical location 160, such as a store, and also includes a customer device 104 that a customer 102 visiting the store uses and a receipt store 118 on a cloud 120.

In FIG. 17, the customer 102 is a customer engaging in a commercial transaction. For example, the customer 102 is in a state of purchasing merchandise or a service at a store where the customer 102 is physically present. Items to be purchased include any type of merchandise or service.

The customer 102 has the customer device 104. The customer device 104 stores a profile of the customer 102 in a digitized form. The profile includes various pieces of information that can be used by the customer 102 to engage in a commercial transaction. For example, as the profile information, the customer device 104 stores credit card information, other account information, or information on electronic money to be used by the customer 102 to pay for purchased merchandise.

The customer device 104 is a wireless telephone, a mobile information terminal, a smart card, or any other type of device. The customer device 104 includes a component that stores the profile information described above and includes a component that transmits the profile information to the device reader 106 of an appropriate type. Examples of the components of the customer device 104 and an example of the profile information stored in the customer device 104 are illustrated in FIG. 20 and will be described later with reference to FIG. 20.

The device reader 106 is a component used to read out information to be transmitted by the customer device 104. For example, the device reader 106 can read out information on a device that meets the ISO (International Standard Organization) 14443 standard for contactless IC cards or a device that uses Near Field Communication (NFC) technology. In one example, the customer device 104 is a wireless telephone equipped with the NFC technology, and as the customer 102 "swipes" the wireless telephone within a few inches of the device reader 106, the device reader 106 can read out information from the customer device 104. However, the content described above is merely an example, and it suffices that the device reader 106 can read out information from the customer device 104 of any type by using any type of technology or communication mechanism.

Profile information 108 is information stored in the customer device 104. The profile information 108 includes the name of the customer 102, payment information such as a credit card number, or any other information. An example of specific information of such profile information 108 will be described later with reference to FIG. 20. The customer device 104 transmits the profile information 108 to the device reader 106.

In an example of a commercial transaction scenario, a purchase of merchandise is accomplished through a plurality of different components including the device reader 106 and the point of sales (POS) component 110. The POS component 110 is a cash register, a retail kiosk, or any other type of device or system used to facilitate sales. Typically, for example, in a case of a bricks-and-mortar store, a restaurant, or the like, the POS component 110 is installed at a location where the commercial transaction in which the customer is physically engaging takes place and used for the commercial transaction. A scenario of a location where the customer is physically engaging is in a contrasting relationship to an internet purchase or electronic commerce scenario or other scenario where a remote commercial transaction is carried out over a network.

As such, FIG. 17 illustrates, as one example, a case in which a variety of elements are installed altogether in the same physical location 160, such as a store, enclosed by the dotted line. For example, in a case in which the POS component 110 is a cash register, items of merchandise to be purchased or sold and the prices of those items of merchandise are entered into the POS component 110. The entry into the POS component 110 is carried out through a keyboard, a barcode reader, or any other type of mechanism. Alternatively, the stated information is acquired by accessing a PLU (Price Look-Up) table in which the items of merchandise, the prices of the items of merchandise, and so on are registered in advance.

The device reader 106 and the POS component 110 are configured as separate components that are interconnected. In another example, the device reader 106 is embedded in the POS component 110.

FIG. 17 illustrates a case in which the POS component 110 receives a display 111 of information on items of merchandise to be sold/items of merchandise to be purchased 112 and/or item prices 114 of these items. The display 111 of the information on the items 112 and the item prices 114 can be received in any method in the POS component 110. In the example illustrated in FIG. 17, the POS component 110 can connect, for example, to a database (PLU table) that includes a catalog of items that can be sold and the item prices of these items. Then, the items 112 of merchandise to be sold/purchased can be entered through a keyboard, the device reader 106, a touch pad, or the like, and the item prices 114 can be searched by accessing the database. Alternatively, in an example in which the POS component 110 is a cash register, a cashier can directly enter the item prices 114 into the cash register.

Upon the completion of a commercial transaction, the POS component 110 generates an electronic receipt 116. The POS component 110 may generate a partial receipt composed of items excluding payment information that is to be added later by the device reader 106 when the payment for the charge is collected from the customer 102. The electronic receipt 116 may include, for example, purchased items 152, item price(s) 154, a total monetary amount 156 of the purchased items, payment information 158 (e.g., the monetary amount paid for the purchase and the form of payment), or any other type of information.

The electronic receipt 116 is transmitted from the POS component 110 to the receipt store 118 on the cloud 120. Typically, the cloud 120 is provided by a remote device and software and constitutes a collection of functions and/or services that interact with each other via a network. The receipt store 118 can receive the electronic receipt 116 and execute various operations in relation to the electronic receipt 116. For example, the customer 102 can be provided with the contact address of the electronic receipt 116 for the customer 102 and presented with the electronic receipt 116 for the customer 102. Thus, the customer 102 can find various facts (e.g., the type of the purchased items, the purchased items, the monetary amount paid, and so on) included in the electronic receipt 116.

FIG. 17 illustrates, as an example, a case in which the POS component 110 transmits the electronic receipt 116 via the cloud 120, but the electronic receipt 116 can also be transmitted to the receipt store 118 with the use of a method that does not involve the cloud 120, such as a dedicated circuit. The electronic receipt 116 is transmitted to the receipt store 118 by various components of the electronic receipt system 100. FIG. 17 illustrates an example in which the POS component 110 transmits the electronic receipt 116 to the receipt store 118.

However, as illustrated in FIG. 18 or FIG. 19, for example, the electronic receipt 116 can also be transmitted by another component of the electronic receipt system 100, such as the device reader 106 or the customer device 104. FIG. 18 and FIG. 19 are system configuration diagrams each illustrating an example in which a component other than the POS component 110 of the electronic receipt system 100 transmits the electronic receipt 116 to the receipt store 118. FIG. 18 illustrates a case in which the device reader 106 transmits the electronic receipt 116, and FIG. 19 illustrates a case in which the customer device 104 transmits the electronic receipt 116. In FIG. 18 and FIG. 19, the reference characters given to the components designate the identical components illustrated in FIG. 17. However, the reference characters 152, 154, 156, and 158 designating the detailed items in the electronic receipt 116 are not repeated and thus omitted in FIG. 18 and FIG. 19.

In the case illustrated in FIG. 18, the POS component 110 generates a partial receipt 122. The partial receipt 122 does not include payment information but includes the other information included in the electronic receipt 116 illustrated in FIG. 17. The payment information can be inserted to the partial receipt 122 by the device reader 106 and reflect a payment made by the customer 102 after the POS component 110 ensures that the sum total for the purchase has been paid. The partial receipt 122 is used by the device reader 106 and takes a receipt format in which the payment information is omitted, and the purchased merchandise and/or the sum total can be expressed in several formats.

The device reader 106 generates the electronic receipt 116 of an appropriate format upon the payment having been received by referring to the partial receipt 122. Specifically, upon receiving the partial receipt 122 and then generating the electronic receipt 116, the device reader 106 transmits the electronic receipt 116 to the receipt store 118 via the cloud 120.

In the case illustrated in FIG. 19, similarly to the case illustrated in FIG. 18, the POS component 110 transmits the partial receipt 122 to the device reader 106. The device reader 106 then adds the payment information to the partial receipt 122 and generates the electronic receipt 116. The device reader 106 transmits the generated electronic receipt 116 to the customer device 104. The customer device 104 transmits the electronic receipt 116 to the receipt store 118 via the cloud 120. It is to be noted that the foregoing descriptions merely illustrate examples, and the POS component 110 can also generate a complete electronic receipt 116.

Next, an example of a block configuration of the customer device 104 illustrated in the system configuration diagram of FIG. 17 will be described with reference to FIG. 20. FIG. 20 is a block configuration diagram illustrating an example of a block configuration of the customer device 104 illustrated in the system configuration diagram of FIG. 17, and the customer device 104 includes components that are used to store and transmit various pieces of profile information 108.

The customer device 104 illustrated in FIG. 20 includes at least a storage component 1002, a communication component 1004, and a processor 1006, and the profile information 108 is stored in the storage component 1002. The customer device 104 is, for example, a mobile terminal, a mobile phone, a portable calculator, a smartphone, a smart card, or any other type of device.

The storage component 1002 may be constituted by any of a flash memory, a read only memory, a volatile memory, a disk, and the like. The communication component 1004 can be used for the customer device 104 to carry out unidirectional communication or bidirectional communication with the world outside the customer device 104. For example, the communication component 1004 can include a wired or wireless network interface, a serial port, a parallel port, an antenna, or any other type of one or more communication components that are each stand-alone or combined with each other. The processor 1006 is a constituent element used for the customer device 104 to execute a command. The command is stored in the storage component 1002 and then executed or received via the communication component 1004 and then executed.

The profile information 108 is stored in the storage component 1002, as described above. FIG. 20 illustrates various types of information included in the profile information 108. However, the specific information illustrated in FIG. 20 is an example, and generally the profile information 108 may include any type of information. Furthermore, information to be transmitted when the customer device 104 transmits the profile information 108 may include the entire profile information on the customer stored by the customer device 104 or may be some subsets of the profile information (or convolution information such as a hash) on the customer.

The profile information 108 illustrated in FIG. 20 includes a customer name 1008, a contact address 1010, and payment account information 1012. The customer name 1008 is expressed in the form of a text string. The contact address 1010 includes any type of contact address, such as a telephone number 1014, an IM (Instant Messenger) address 1016, an email address 1018, a receipt store customer identifier 1019, or any other type of contact address. Any one or more of the contact addresses allow the location to which an electronic receipt for the customer is to be transmitted to be identified.

For example, in a case in which the customer 102 subscribes to a receipt store service and the receipt store service provides the customer 102 with a location to which the electronic receipt 116 is to be transmitted, such as an email address, an IM address, an SMS (Short Message Service) address, or a URL (Uniform Resource Locator), the location to which the electronic receipt 116 is transmitted is included in the contact address 1010. In one example, FIG. 17 illustrates a case in which the location to which the electronic receipt 116 is transmitted as identified by the contact address 1010 is set as the communication address of the receipt store 118.

The payment account information 1012 is information for identifying various types of accounts to be used to pay for the charge when the customer purchases merchandise. The payment account information 1012 includes credit card information 1020, household account information 1022 (e.g., an in-store account number), a gift certificate 1024, a micropayment structure or lump-sum payment account 1026, or any other type of account information such as electronic money.

Next, a process in which the electronic receipt 116 is generated in the POS component 110 and the device reader 106 in the system configuration diagram illustrated in FIG. 17 will be described with reference to FIG. 21. FIG. 21 illustrates a process example in which a commercial transaction is executed and the electronic receipt 116 (or a portion of the electronic receipt 116) is generated in the process of generating the electronic receipt 116 in the POS component 110 and the device reader 106 in the system configuration diagram illustrated in FIG. 17. In the generation example illustrated in FIG. 21, illustrated is a process in which the electronic receipt 116 or the partial receipt 122 that does not include the payment information is generated in the POS component 110.

In FIG. 21, first, the customer 102 operates the customer device 104 to transmit the profile information from the customer device 104 to the device reader 106 (sequence S502). In a case in which the customer device 104 is a portable wireless telephone, for example, the customer name, the account number, the contact address, and so on are stored in the customer device 104 as the profile information. This profile information is read out through the operation of the customer 102 and transmitted to the device reader 106. The transmission can be carried out with the use of any type of data transmission technology, such as the NFC technology, a wireless LAN, Bluetooth (registered trademark), or an optical barcode.

Upon receiving the profile information transmitted from the customer device 104 (sequence S504), the device reader 106 transmits the received profile information to the POS component 110 (sequence S506). For example, the device reader 106 is connected to the POS component 110 via a cable and can operate as an interface that relays information between the customer device 104 and the POS component 110.

Upon receiving the profile information (sequence S508), the POS component 110 receives display information on the items of purchased merchandise purchased by the customer 102, the prices of the items, and/or other sales data (sequence S510). Herein, the POS component 110 may receive the display information on the items of purchased merchandise, the prices of the items, and other sales data through any reception method.

The POS component 110 generates the electronic receipt 116 or the partial receipt 122 for the commercial transaction (sequence S512). As described above, the POS component 110 can generate the complete electronic receipt 116 for the commercial transaction and can also generate the partial receipt 122 with information excluding the payment information from the information used for the electronic receipt 116.

Next, a process up to a point when the electronic receipt 116 is transmitted to the receipt store 118 from the customer device 104 in the system configuration diagram illustrated in FIG. 19 will be described with reference to FIG. 22. FIG. 22 is an illustration for describing an example of a process up to a point when the electronic receipt 116 generated in the POS component 110 and the device reader 106 in the system configuration diagram illustrated in FIG. 19 is transmitted to the receipt store 118 from the customer device 104. FIG. 22 illustrates a case in which the partial receipt 122 that does not include the payment information is generated in the POS component 110 and the complete electronic receipt 116 is generated with the payment information and other information added in the device reader 106.

In FIG. 22, first, the POS component 110 transmits the generated partial receipt 122 to the device reader 106 (sequence S802). Upon receiving the partial receipt 122 (sequence S804), the device reader 106 then adds the payment information and other information to the partial receipt 122 to generate the complete electronic receipt 116 (sequence S806). The device reader 106 transmits the generated electronic receipt 116 to the customer device 104 (sequence S808).

Upon receiving the electronic receipt 116 (sequence S810), the customer device 104 stores a copy of the received electronic receipt 116 into the storage component 1002 (a memory or a storage device) of the customer device 104 itself (sequence S812). Thereafter, the customer device 104 transmits the electronic receipt 116 to the receipt store 118 on the cloud 120 (sequence S814).

The electronic receipt 116 can be transmitted to the receipt store 118 from the customer device 104 with the use of any mechanism. For example, in a case in which the customer device 104 is a wireless telephone, the electronic receipt 116 can be transmitted with the use of a variety of technologies that can be used to transmit information to a wireless telephone or to receive information from a wireless telephone, such as 3G (The Third Generation) technology (sequence S816), wireless LAN technology or Wi-Fi technology (sequence S818), Enhanced Data rates for GSM (registered trademark) Evolution (EDGE) technology (sequence S820), Short Message Service (SMS) technology (sequence S822), or any other mechanism.

The use of the electronic receipt 116 generated through the system as described above and stored in the receipt store 118 enables the customer to easily acquire information on the purchased merchandise, and the customer can check, for example, whether the entire purchased merchandise purchased while traveling is in the bag storing goods.

CITATION LIST

Patent Literature

Patent Literature 1: Published Japanese Translation of PCT International Publication for Patent Application, No. 2011-524051

SUMMARY OF INVENTION

Technical Problem

However, with the related art as described in Patent Literature 1 (the technique described with reference to FIG. 15 to FIG. 22 above), it is possible to check whether the merchandise purchased during travel is all there, but it is not possible to check whether the total weight of the weight of the purchased merchandise and the weight of the bag storing the purchased merchandise is not over the baggage weight limit of the airplane boarding guideline. Therefore, for example, the related art suffers from shortcomings in that a trouble that is totally unexpected at the time of purchasing the merchandise may occur suddenly, namely, a trouble in which it is found that the baggage is over the baggage weight limit of the airplane boarding guideline and a payment of an excess fee is requested during the procedures for boarding the airplane to return home.

Aim of the Present Disclosure

The present disclosure has been made in view of such shortcomings and is directed to providing an information processing apparatus, an electronic receipt system, a mobile terminal, a baggage weight checking method, and a baggage weight checking program that make it possible to grasp a total weight of purchased merchandise with the use of an electronic receipt for the purchased merchandise.

Solution to Problem

In order to solve the above-described problem, an information processing apparatus, an electronic receipt system, a mobile terminal, a baggage weight checking method, and a baggage weight checking program according to the present invention mainly have the following characteristic configurations, respectively.

(1) An information processing apparatus according to the present disclosure includes:

receiving means for receiving, from a store terminal, information on merchandise purchased by a customer;

storing means for storing at least one of a weight and a volume of the merchandise associated with the customer; and controlling means for causing information including at least one of the weight and the volume of the merchandise purchased within a predetermined period by the customer to be displayed in a terminal device as output information in response to a request from the terminal device.

(2) The information processing apparatus according to the present disclosure, wherein the controlling means causes a plurality of regions to be displayed in the terminal device as the output information, and each region of the plurality of regions includes information on the merchandise purchased by the customer and a total value of at least one of the weight and the volume of the merchandise included in each region of the plurality of regions.

(3) An electronic receipt system according to the present disclosure, includes:

a mobile terminal in possession of a customer;
a POS (Point of Sales) device installed at a store; and
an electronic receipt center on a cloud, wherein the POS device generates, as a digitized electronic receipt, receipt information on purchased merchandise purchased by a customer at the store and transmits the electronic receipt to the electronic receipt center, the electronic receipt center stores the received electronic receipt and, upon receiving a transmission request for the electronic receipt from the mobile terminal of the customer, transmits the stored electronic receipt for the customer to the mobile terminal that has made the request, when generating the electronic receipt, the POS device acquires information indicating a weight of the purchased merchandise purchased by the customer and generates the electronic receipt in a format in which the information indicating the weight of the purchased merchandise is further added, and upon receiving the electronic receipt for the customer from the electronic receipt center, the mobile terminal provides a screen display of the information indicating the weight of the purchased merchandise included in the electronic receipt.

(4) A mobile terminal according to the present disclosure, constituting an electronic receipt system of a customer; the electronic receipt system includes:

a POS (Point of Sales) device installed at a store; and
an electronic receipt center on a cloud, wherein when generating, as a digitized electronic receipt, receipt information on purchased merchandise purchased by a customer at the store, the POS device acquires information indicating a weight of the purchased merchandise purchased by the customer, generates the electronic receipt in a format in which the information indicating the weight is further added, transmits the electronic receipt to the electronic receipt center to be stored therein, and thereafter the mobile terminal receives the electronic receipt for the customer from the electronic receipt center by making an acquisition request for the electronic receipt for the customer to the electronic receipt center and provides a screen display of the information indicating the weight of the purchased merchandise included in the electronic receipt.

(5) A baggage weight checking method according to the present disclosure, with the use of an electronic receipt system to check a weight of purchased merchandise handled as a baggage, includes:

a mobile terminal in possession of a customer;
a POS (Point of Sales) device installed at a store; and
an electronic receipt center on a cloud, wherein the POS device generates, as a digitized electronic receipt, receipt information on purchased merchandise purchased by a customer at the store and transmits the electronic receipt to the electronic receipt center, the electronic receipt center stores the received electronic receipt and, upon receiving a transmission request for the electronic receipt from the mobile terminal of the customer, transmits the stored electronic receipt for the customer to the mobile terminal that has made the request, when generating the electronic receipt, the POS device acquires information indicating a weight of the purchased merchandise purchased by the customer and generates the electronic receipt in a format in which the information indicating the weight of the purchased merchandise is further added, and upon receiving the electronic receipt for the customer from the electronic receipt center, the mobile terminal provides a screen display of the information indicating the weight of the purchased merchandise included in the electronic receipt.

(6) A baggage weight checking program according to the present disclosure, configured to carry out a baggage weight checking method according to the above-mentioned (3) as a program that can be executed by a computer.

Advantageous Effects of Invention

The information processing apparatus, the electronic receipt system, the mobile terminal, the baggage weight checking method, and the baggage weight checking program according to the present disclosure allow a customer using an airplane to easily check the total weight of the merchandise purchased by the customer by operating the mobile terminal in possession of the customer prior to going through the procedures for boarding the airplane and by using the information on the electronic receipt for the purchased merchandise. Therefore, on occurrence of an excess fee incurred due to the weight of the baggage being over the baggage weight limit while going through the airplane boarding procedures can be prevented.

BRIEF DESCRIPTION OF DRAWINGS

FIG. 5 is a table illustrating an example of data of an electronic receipt stored in the memory of the POS device illustrated in FIG. 1.

FIG. 16 illustrates the content of the guideline for baggage to be checked into a cargo compartment of the airplane.

DESCRIPTION OF EMBODIMENTS

Figure 1:
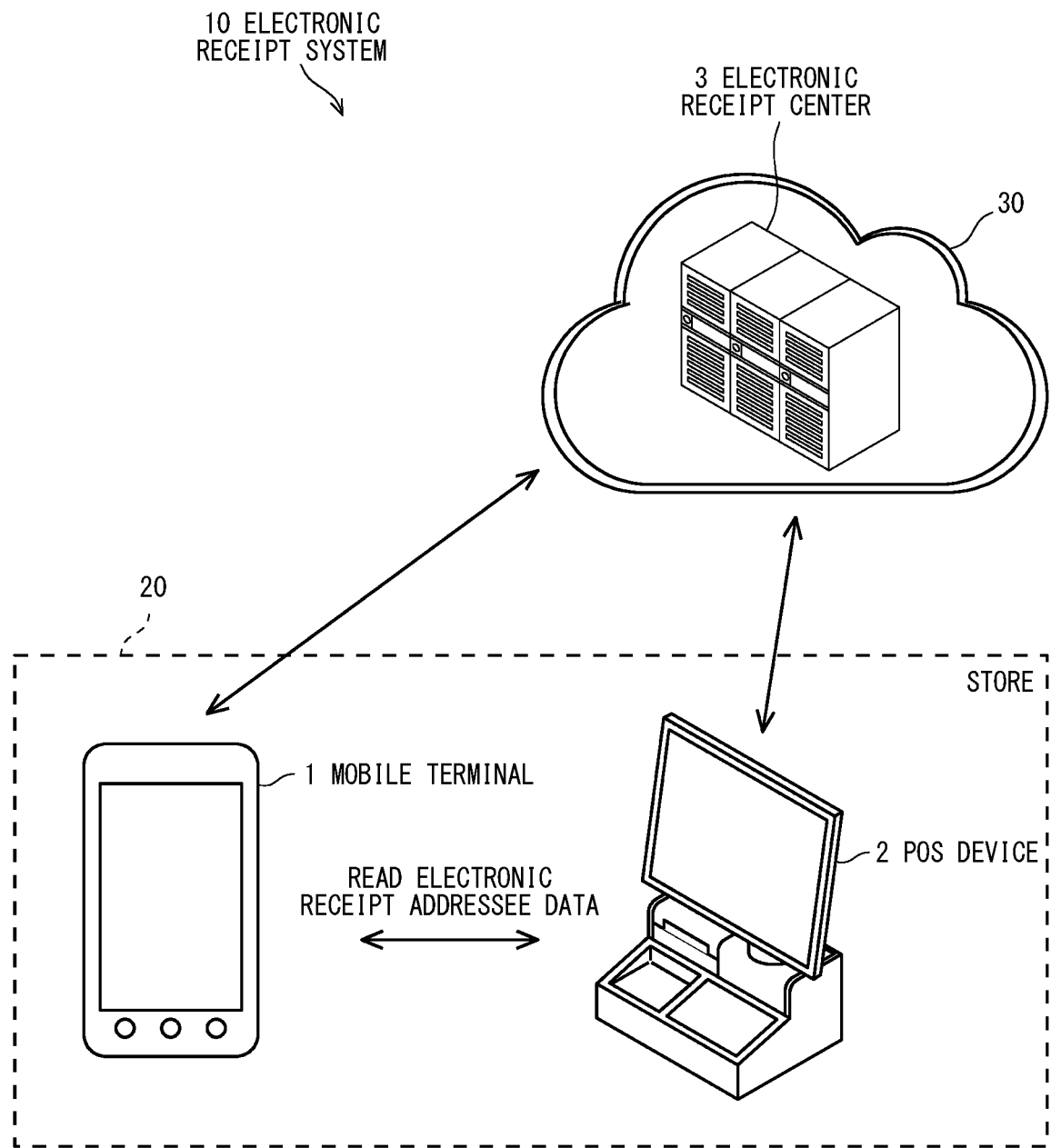
FIG. 1 is a system configuration diagram for describing an example of a system configuration of an electronic receipt system according to the present disclosure.

Hereinafter, preferred embodiments of an information processing apparatus, an electronic receipt system, a mobile terminal, a baggage weight checking method, and a baggage weight checking program according to the present disclosure will be described with reference to the appended drawings. In the following descriptions, an electronic receipt system, a mobile terminal, and a baggage weight checking method according to the present disclosure will be described, and it is needless to say that the baggage weight checking method may be implemented as a baggage weight checking program that can be executed by a computer or that the baggage weight checking program may be recorded on a computer readable recording medium. In addition, basic elements of the electronic receipt system can of course be expressed as an information processing apparatus. Furthermore, it is needless to say that the reference characters indicated in the following drawings are given to the elements as examples for the sake of convenience to facilitate understanding and are not intended to limit the present disclosure to the illustrated embodiments.

Features of the Present Disclosure

Prior to describing embodiments of the present disclosure, an overview of features of the present disclosure will be described first. A primary feature of the present disclosure is to notify a customer about a total weight of merchandise purchased by the customer by displaying the total weight with the use of a technique related to an electronic receipt. To be more specific, a primary feature is to allow the customer using an airplane to easily check the total weight of the purchased merchandise purchased by the customer including the weight of the bag itself storing the purchased merchandise by operating a customer device, or a mobile terminal, in possession of the customer in advance prior to boarding the airplane to use the information on the electronic receipt for the purchased merchandise. Then, an advantageous effect that an occurrence of an excess fee incurred due to the weight of the baggage being over the baggage weight limit while going through the airplane boarding procedure can be prevented in advance can be obtained.

Embodiments of the Present Disclosure

Next, an example of embodiments according to the present disclosure will be described in detail with reference to the drawings. As described above regarding the related art, in recent years, an electronic receipt system that stores merchandise purchase information on a server (an electronic receipt center, a receipt store, or the like) on the cloud or the like and manages the merchandise purchase information has been proposed. As described in Patent Literature 1 described above, the use of such an electronic receipt system enables the customer to grasp information on all of the purchased merchandise and, for example, enables a person visiting Japan to easily grasp information on all the purchased merchandise. In addition, the customer can easily check visually whether all the purchased items can be stored in a hand bag or a bag upon bringing back the purchased merchandise to a hotel where the customer is staying.

However, as described above, there is a problem to be solved in that whether the weight of the purchased merchandise meets the baggage weight limit guideline for an airplane cannot be grasped easily without a scale. The present disclosure has been made to solve such a problem and is directed to providing a means that makes it possible to easily grasp the total weight of the entire purchased merchandise with the use of an electronic receipt technology.

Configuration Example of Embodiment

Next, a system configuration example of an electronic receipt system according to the present disclosure will be described with reference to a system configuration diagram illustrated in FIG. 1. FIG. 1 is a system configuration diagram for describing an example of a system configuration of an electronic receipt system according to the present disclosure.

An electronic receipt system 10 illustrated in FIG. 1 includes a mobile terminal 1 to be carried by a customer, a POS device 2 (corresponding to the store terminal described above) installed in a store 20, and an electronic receipt center 3 present on a cloud 30.

Herein, the mobile terminal 1 is a customer device carried by the customer and is any terminal device, such as a mobile phone, a smartphone, or a portable calculator, as described above. The mobile terminal 1 stores information on electronic money, a credit card number, or the like to be used to pay the charge for purchased merchandise, information on the weight of a bag owned by the customer to store purchased items and so on, address information within the electronic receipt center 3 to which an electronic receipt for the customer is transmitted, and other profile information. In addition, the mobile terminal 1 includes a transmission/reception unit that transmits and receives information to and from the POS device 2 installed in the store 20 and to and from the electronic receipt center 3 on the cloud 30.

Through the communication with the POS device 2 in the store 20, the mobile terminal 1 can transmit, to the POS device 2, the information on the electronic money, the credit card number, or the like stored in the mobile terminal 1, the address information within the electronic receipt center 3 to which the electronic receipt for the customer is transmitted, and other profile information to carry out payment processing. In addition, through the communication with the electronic receipt center 3, the mobile terminal 1 can access the address to which the electronic receipt for the customer is transmitted to acquire the information on the electronic receipt. Although the details will be described later, the electronic receipt includes the weight of each piece of purchased merchandise and, in some cases, information indicating the volume (size).

Figure 15:
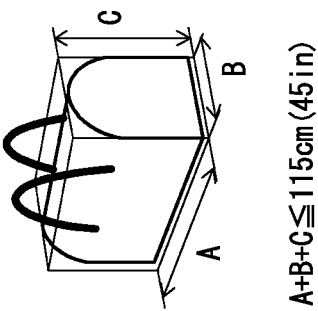
FIG. 15 illustrates the content of the guideline for baggage to be carried into an airplane cabin.
Figure 17:
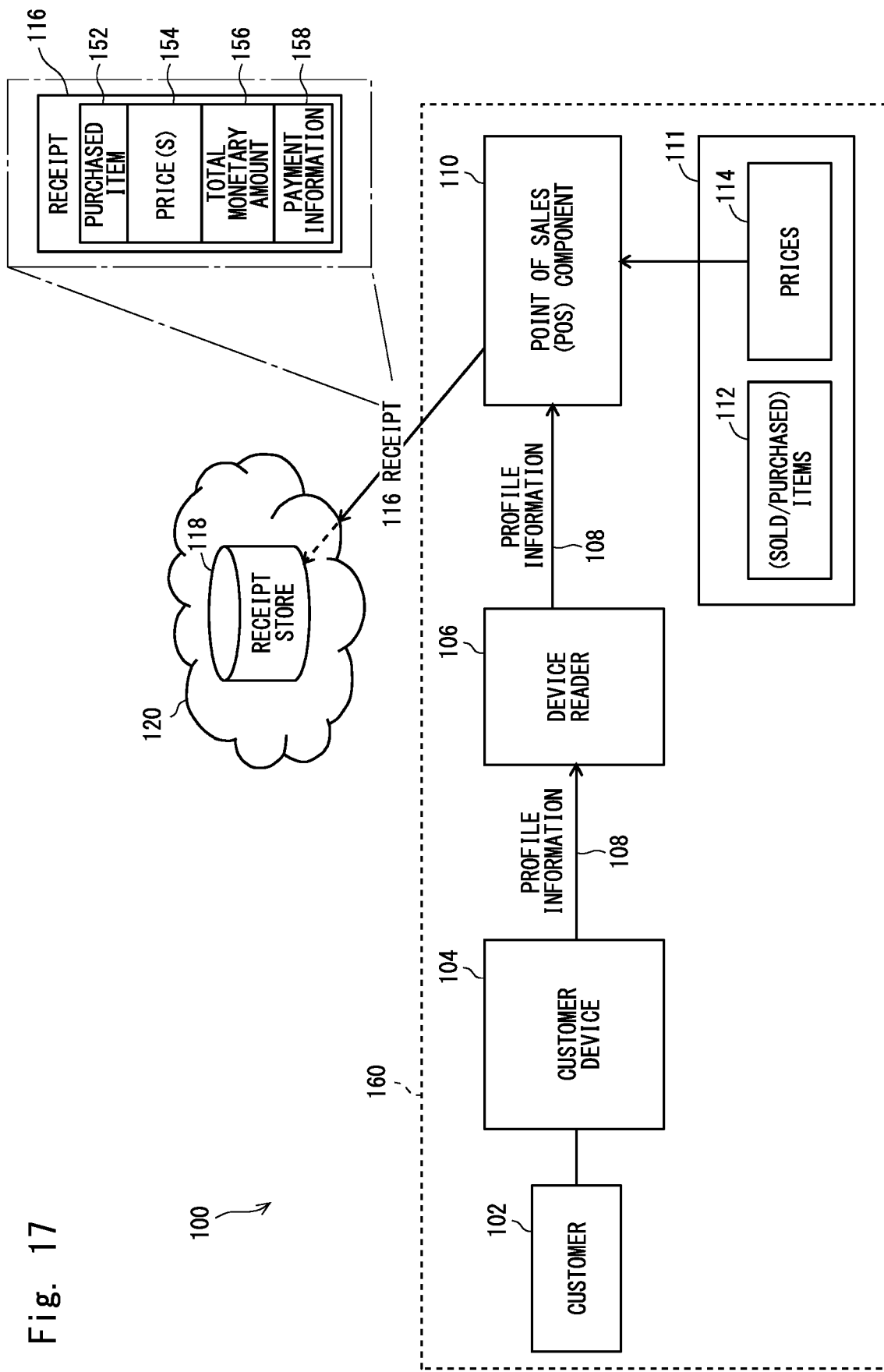
FIG. 17 is a system configuration diagram of an electronic receipt system described in Patent Literature 1 described above as a system configuration example in which an electronic receipt can be generated and transmitted to a receipt store.
Figure 18:
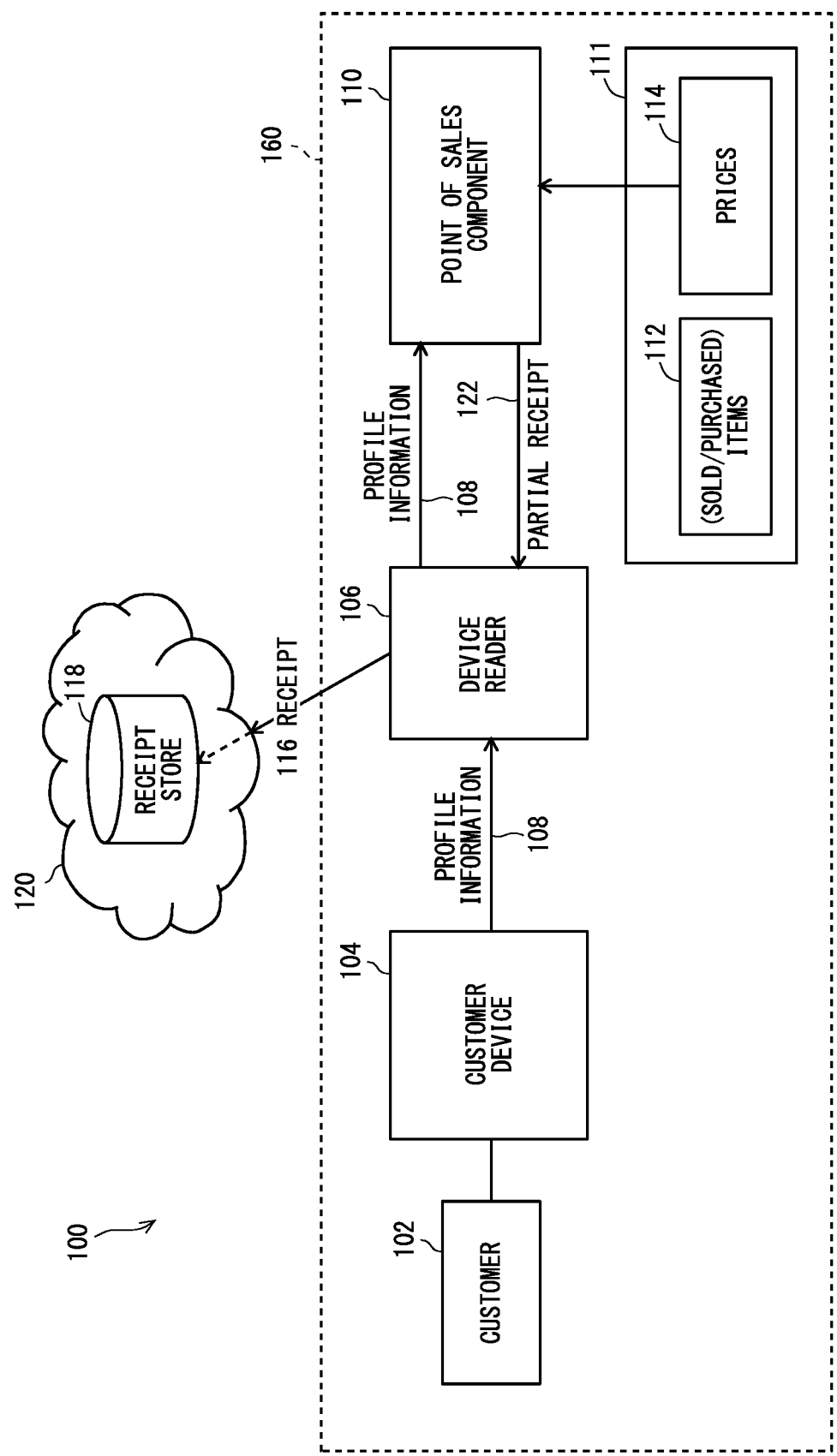
FIG. 18 is system configuration diagram illustrating an example in which a component other than the POS component of the electronic receipt system illustrated in FIG. 17 transmits the electronic receipt to the receipt store.
Figure 19:
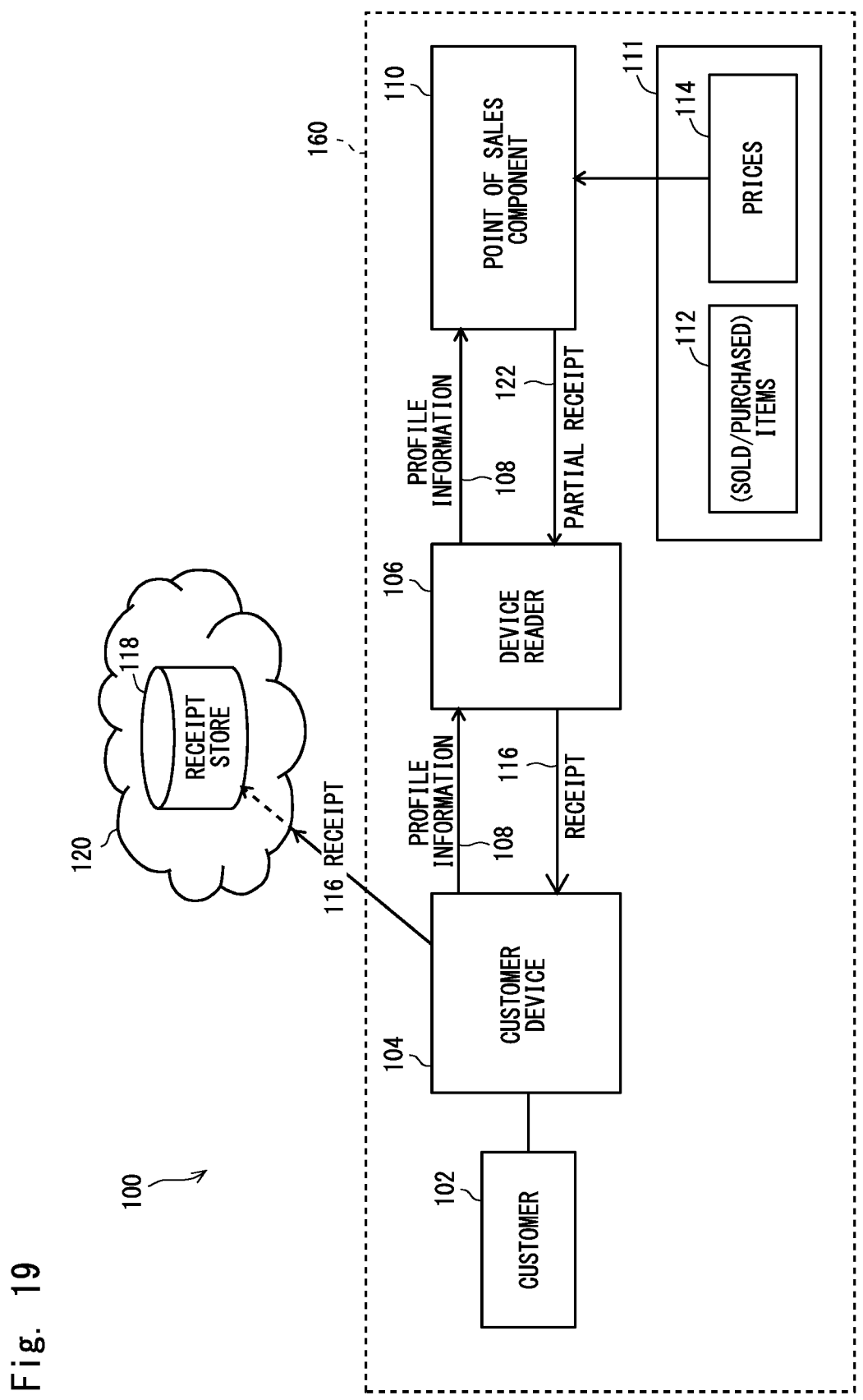
FIG. 19 is system configuration diagram illustrating an example in which a component other than the POS component of the electronic receipt system illustrated in FIG. 17 transmits the electronic receipt to the receipt store, and this example is different from that illustrated in FIG. 18.
Figure 20:
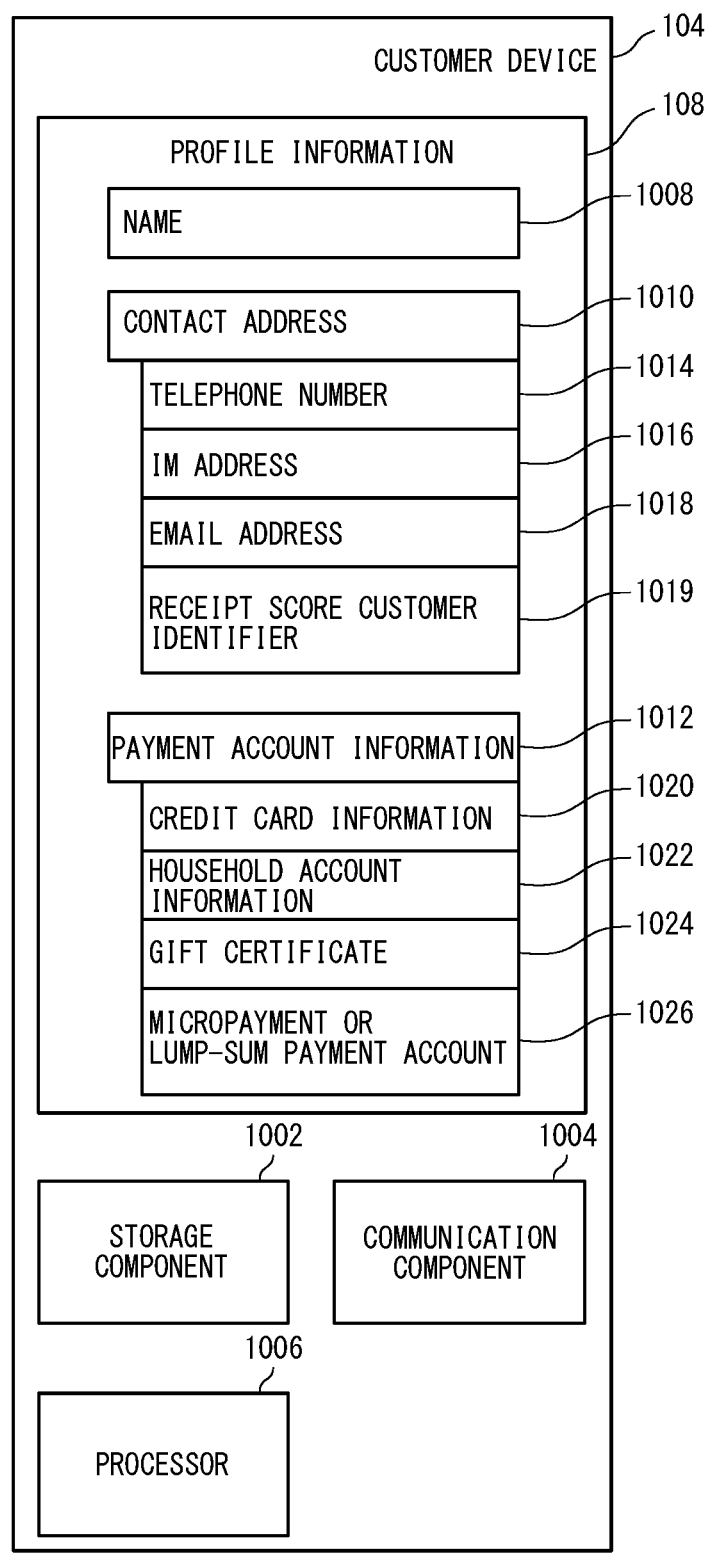
FIG. 20 is a block configuration diagram illustrating an example of a block configuration of the customer device illustrated in the system configuration diagram of FIG. 17.
Figure 21:
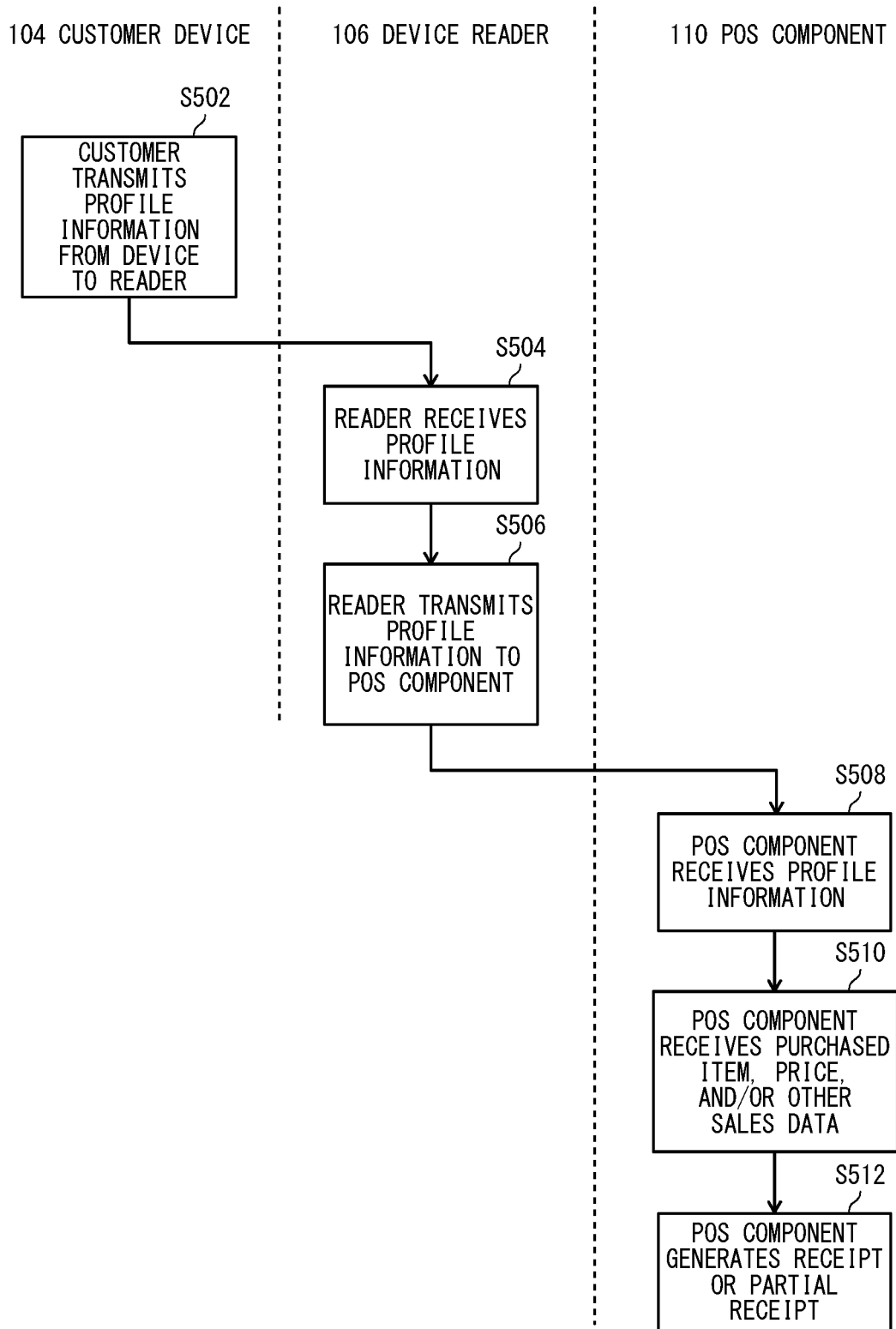
FIG. 21 an illustration for describing an example of a process up to a point when the electronic receipt is generated in the POS component and the device reader in the system configuration diagram illustrated in FIG. 17.
Figure 22:
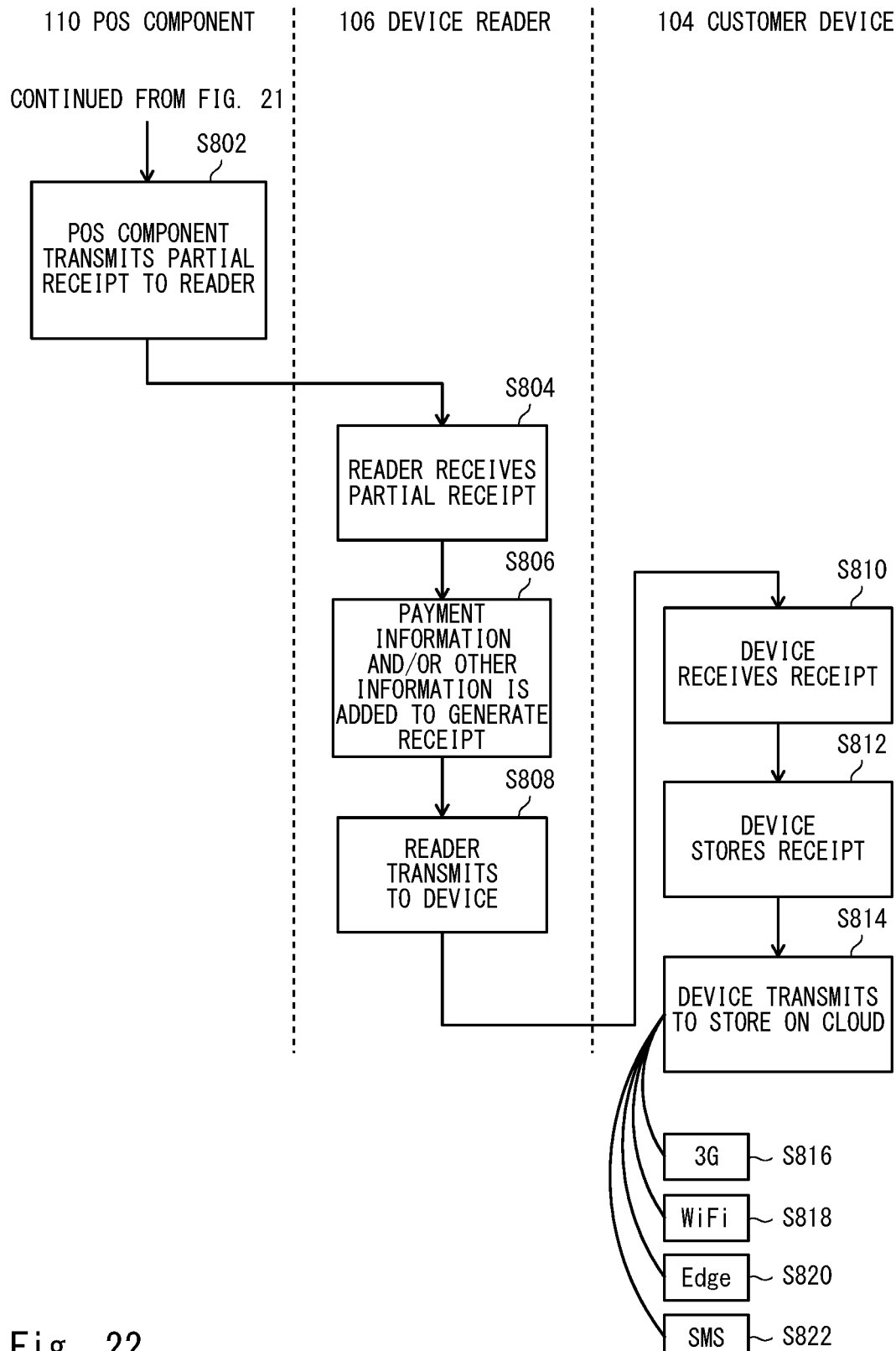
FIG. 22 is an illustration for describing an example of a process up to a point when the electronic receipt generated in the POS component and the device reader in the system configuration diagram illustrated in FIG. 19 is transmitted to the receipt store from the customer device.

The mobile terminal 1 extracts the weight information (the total weight including the weight of the storing bag itself) on the purchased merchandise included in the electronic receipt acquired from the electronic receipt center 3, generates a baggage weight display screen that makes it possible to easily check whether the total weight is over the weight limit for carry-on baggage or the weight limit for cargo-compartment check-in baggage defined by the airplane baggage allowance guideline illustrated in FIG. 15 and FIG. 16, and displays the screen. Through a screen operation by the customer, the baggage weight display screen allows for such a screen operation for moving a storing destination of purchased merchandise to another bag or for discarding purchased merchandise and allows for a screen display upon recalculating the total weight resulting from the screen operation.

In addition, in some cases, the mobile terminal 1 is provided with a function of extracting information on the volume (size) of purchased merchandise included in an electronic receipt and displaying a warning indicating that the purchased merchandise cannot be stored in the bag if it is determined that it is difficult to store the purchased merchandise in the bag on the basis of a comparison result with the volume of the bag for storage (the maximum volume that can be stored).

The POS device 2 is a device in which the POS component 110 and the device reader 106 described in Patent Literature 1 described above are integrated. However, this embodiment is not limiting, and similarly to Patent Literature 1 described above, the POS component 110 and the device reader 106 may be separated. The POS device 2 is installed in the store 20, carries out payment processing of purchased merchandise purchased by the customer, generates an electronic receipt for the purchased merchandise, and transmits the electronic receipt to the electronic receipt center 3 on the cloud 30.

In addition, the POS device 2 acquires, from the mobile terminal 1 of the customer visiting the store 20, information on electronic money, a credit card number, or the like to be used to pay the charge for purchased merchandise, information on the weight of the bag for storing items (including the purchased merchandise and so on) owned by the customer, address information within the electronic receipt center 3 to which an electronic receipt for the customer is transmitted, and other profile information and uses such information in the payment processing and processing of generating an electronic receipt. The electronic receipt may be generated in the POS device 2 through a procedure substantially similar to that described in Patent Literature 1 described above, and thus duplicate descriptions thereof will be omitted herein. In addition, in the present embodiment, information included in an electronic receipt will be described later.

The electronic receipt center 3 has a function of storing an electronic receipt transmitted from the POS device 2 and providing various services related to the electronic receipt for the customer in response to an access from the mobile terminal 1 of the customer. For example, the electronic receipt center 3 has a function of transmitting an electronic receipt for purchased merchandise purchased by the customer to the mobile terminal 1 of the customer in a case in which a transmission request for the electronic receipt is received from the mobile terminal 1 of the customer. The method of managing an electronic receipt in the electronic receipt center 3 is substantially the same as the method of managing an electronic receipt in the receipt store described in Patent Literature 1 described above, and thus duplicate descriptions thereof will be omitted herein.

Figure 2:
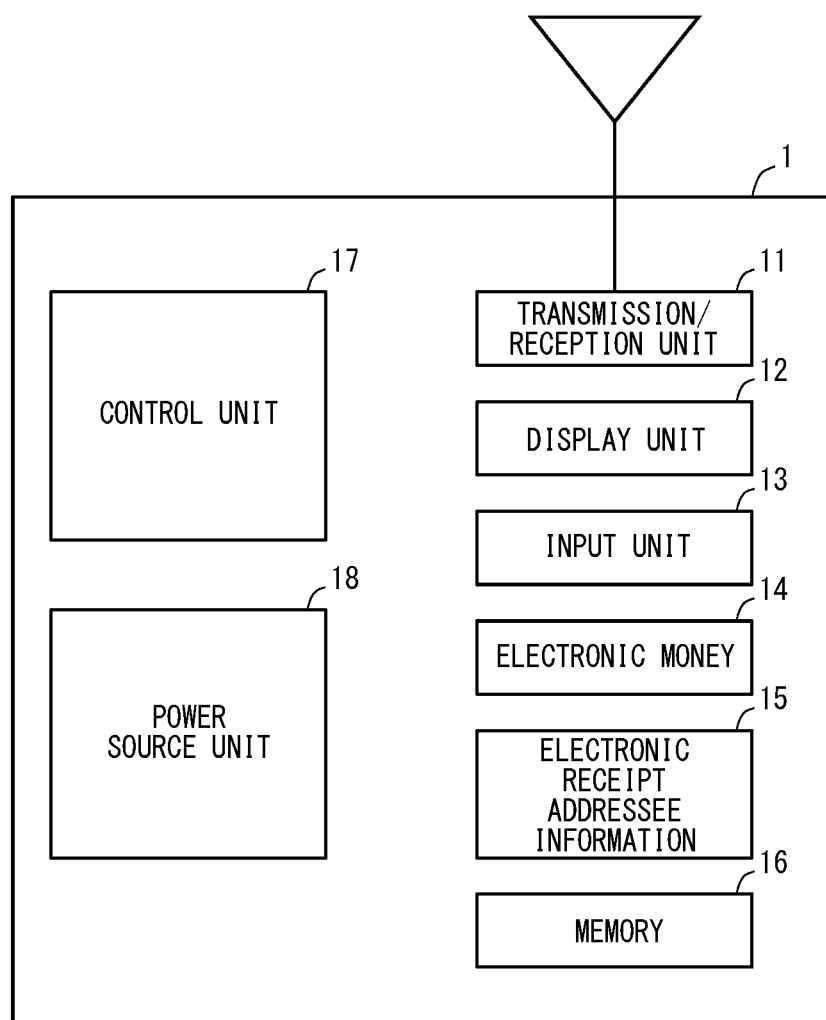
FIG. 2 is a block configuration diagram illustrating an example of an internal configuration of the mobile terminal constituting the electronic receipt system illustrated in FIG. 1.

Next, an internal configuration of the mobile terminal 1 carried by the customer will be described with reference to a block configuration diagram illustrated in FIG. 2. FIG. 2 is a block configuration diagram illustrating an example of an internal configuration of the mobile terminal 1 constituting the electronic receipt system 10 illustrated in FIG. 1.

The mobile terminal 1 illustrated in FIG. 2 includes at least a transmission/reception unit 11, a display unit 12, an input unit 13, electronic money information 14, electronic receipt addressee information 15, a memory 16, a control unit 17, and a power source unit 18.

The transmission/reception unit 11 has a function of carrying out wireless communication or wired communication with the POS device 2 and with the electronic receipt center 3. With regard to the mode of wireless communication, various wireless communication schemes, such as wireless LAN, Wi-Fi, and NFC, are supported. The display unit 12 has a function of providing a screen display of various pieces of service information to the customer and can also provide, for example, a screen display of a baggage weight display screen that can display the weight of the purchased merchandise as the total weight including the weight of the bag itself for storing the purchased merchandise. Details will be described later. In addition, the display unit 12 is a touch pad-type display screen and allows the customer to touch the screen with a finger to perform a tapping (or clicking) operation, a drag and drop operation, or the like.

The input unit 13 can accept an instruction for a specific operation, a selection for a specific operation, or a text input through various screen operations via the touch pad described above. In addition, the input unit 13 can accept an input of a specific instruction through a button operation. In addition, the use of an embedded camera function makes it possible to accept an input of an image or a moving image. Furthermore, the input unit 13 can take in, as input information, a command received from the outside (e.g., the POS device 2, the electronic receipt center 3, and so on) via the transmission/reception unit 11.

The electronic money information 14 is information stored in advance as information for making a payment for purchased merchandise and may store a credit card number or the like. The electronic money information 14 is also the information to be transmitted to the POS device 2 as the profile information including the payment information at the time of purchasing merchandise. The electronic receipt addressee information 15 is information indicating the addressee within the electronic receipt center 3 to which an electronic receipt for the customer is transmitted and is the information transmitted to the POS device 2 as the profile information at the time of purchasing merchandise. The electronic receipt addressee information 15 is also used to access the electronic receipt center 3 for acquiring an electronic receipt for the customer.

The memory 16 stores information on an electronic receipt received from the electronic receipt center 3, stores the baggage weight display screen to be displayed in the display unit 12, stores information on the weight and the volume of each of a carry-on bag 1 and a cargo-compartment check-in bag 2 for using an airplane, or in some cases, stores information on the weight limit or the like for carry-on baggage and cargo-compartment check-in baggage defined by an airplane baggage allowance guideline retrieved from a server or the like on the cloud 30. In addition, the memory 16 is used to store various programs, such as a baggage weight checking program, or to temporarily save various pieces of information to work on.

The control unit 17 has a function of controlling the operation of the mobile terminal 1 as a whole and controls executions of various programs, such as the baggage weight checking program, stored in the memory 16. In addition, the control unit 17 receives a command transmitted via the transmission/reception unit 11 and controls an operation corresponding to the instruction content of the command. The power source unit 18 supplies power to each portion of the mobile terminal 1, and a rechargeable battery, such as a lithium-ion rechargeable battery, is used, for example.

Figure 3:
FIG. 3 is a schematic diagram illustrating an example of information incorporated into an electronic receipt used in the electronic receipt system illustrated in FIG. 1.

Next, information incorporated into an electronic receipt used in the present embodiment will be described with reference to FIG. 3. FIG. 3 is a schematic diagram illustrating an example of information incorporated into an electronic receipt used in the electronic receipt system 10 illustrated in FIG. 1. As illustrated in FIG. 3, the information incorporated into the electronic receipt is composed of information on the payment processing carried out by the POS device 2 and information for identifying the POS device 2 that has carried out the payment processing and includes at least store of purchase information 701, purchased merchandise information 702, monetary amount of purchase information 703, and date and time of purchase information 704.

The store of purchase information 701 includes a company name such as AAA Corporation, a store name such as C Company Store, and information on a contact telephone number and a FAX number. The purchased merchandise information 702 includes merchandise name such as merchandise 1, merchandise 2, . . . , the number of units of each type of merchandise purchased×the unit purchase price of each type of merchandise, and the total monetary amount for each type of merchandise. The monetary amount of purchase information 703 includes information on the total monetary amount, the monetary amount in each payment method such as the monetary payment amount in a credit card, cash, or the like, the total number of pieces of purchased merchandise, the consumption tax, and a discount for bringing in an own shopping bag, or the like. The date and time of purchase information 704 includes information on the date of purchase, the day of the week on which the purchase is made, the time of purchase, a cash register number, and the name of a handling staff member or the like.

A PLU (price loop-up) table for registering merchandise information, such as the name of merchandise and the unit price, is normally placed in a merchandise database server to be made available in a self POS in which the customer takes care of the payment of the charge for the purchased merchandise on his/her own, and the merchandise information can be transmitted not only to the POS device 2 but also to a self POS. In the present embodiment, registered in the PLU table are the merchandise code for each type of merchandise, the unit price of the merchandise, and so on as well as the weight data of the merchandise and, in some cases, the dimensions (size) of the merchandise and so on.

Figure 4:
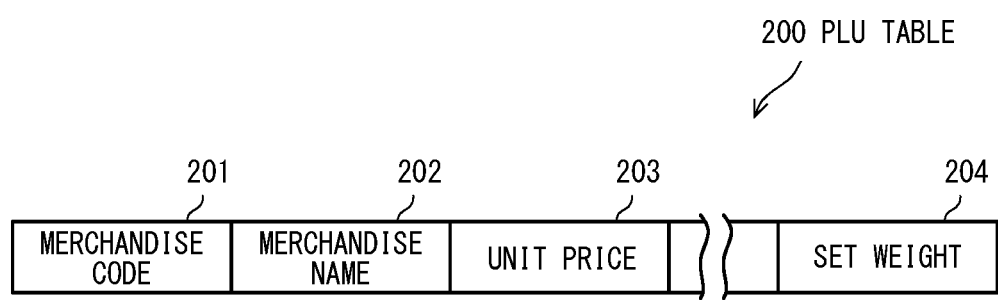
FIG. 4 is a table configuration diagram illustrating an example of a PLU table employed in an embodiment according to the present disclosure.

FIG. 4 is a table configuration diagram illustrating an example of a PLU table employed in an embodiment according to the present disclosure. A PLU table 200 illustrated in FIG. 4 has registered therein a merchandise code 201, a merchandise name 202, a unit price 203, . . . , as well as a set weight 204 for each type of merchandise. Furthermore, although not illustrated, in some cases, information on the dimensions (size) may also be registered. The merchandise code 201 in the PLU table 200 is searched on the basis of a result of scanning a label (a barcode or the like) appended to purchased merchandise, and the merchandise name 202, the unit price 203, . . . , and the set weight 204 corresponding to the matching merchandise code 201, and in some cases, the merchandise information, such as the dimensions (size), are extracted and used as data for calculating the purchase price and as data for generating an electronic receipt. As described above, the PLU table 200 is typically stored in an independent device, serving as a merchandise database server, disposed within the store 20 in a state in which the device can communicate with the POS device 2. However, the PLU table 200 may also be incorporated into the POS device 2 and stored as a database.

The data stored as an electronic receipt into a memory of the PLU table 200 includes at least data on each item of purchased merchandise, as illustrated in FIG. 5, that is based on the result of scanning the purchased merchandise at the POS device 2 and the merchandise information in the PLU table 200 illustrated in FIG. 4. FIG. 5 is a table illustrating an example of data of an electronic receipt stored in the memory of the POS device 2 illustrated in FIG. 1.

As illustrated in FIG. 5, the data of the electronic receipt stored in the memory of the POS device 2 includes at least a name of a store of purchase 401, a date of purchase 402, a time of purchase 403, a name of purchased merchandise 404, a unit price of purchased merchandise 405, and a unit weight of purchased merchandise 406. The data of the electronic receipt holds data on the name of the purchased merchandise, the unit price of the purchased merchandise, and the unit weight of the purchased merchandise for each individual piece of merchandise sorted by the store of purchase and by the date and the time of purchase, and also includes the total (subtotal) purchase price and the total (subtotal) weight obtained by totaling (subtotaling) the purchase price of each individual piece of merchandise and the unit weight multiplied by the number of pieces of purchased merchandise as a subtotal result of the purchased merchandise indicating a merchandise group with the individual pieces of merchandise sorted by the store of purchase and by the date and the time of purchase.

The example illustrated in FIG. 5 relates, for example, to each individual piece of merchandise purchased as the purchased merchandise at a C Company Store as indicated under the name of the store of purchase 401, and on the date of purchase 402 of 2016 Jan. 26 and at the time of purchase 403 of 9:51, a total of seventeen pieces of merchandise including five pieces of merchandise 1 (e.g., cosmetics), ten pieces of merchandise 2 (e.g., medicine), one piece of merchandise 3 (e.g., fever-relieving sheet), and one piece of merchandise 4 (e.g., drinking water) are purchased.

Herein, the unit price of purchased merchandise 405 of the merchandise 1 (e.g., cosmetics) is 1,980 yen, and the unit weight of purchased merchandise 406 is 175 g. The unit price of purchased merchandise 405 of the merchandise 2 (e.g., medicine) is 479 yen, and the unit weight of purchased merchandise 406 is 130 g. The unit price of purchased merchandise 405 of the merchandise 3 (e.g., fever-relieving sheet) is 455 yen, and the unit weight of purchased merchandise 406 is 230 g. The unit price of purchased merchandise 405 of the merchandise 4 (e.g., drinking water) is 138 yen, and the unit weight of purchased merchandise 406 is 640 g. Therefore, the total (subtotal) purchase price of the seventeen pieces of merchandise purchased at 9:51 on 2016 Jan. 26 at the C Company Store is 15,283 yen, and the total (subtotal) weight is 3,045 g. In other words, the purchase price of the purchased merchandise consisting of the seventeen pieces of merchandise as described above, or in other words, the purchase price of the purchased merchandise purchased at 9:51 on 2016 Jan. 26 at the C Company Store is 15,283 yen, and the weight thereof is 3,045 g.

An electronic receipt is generated on the basis of the information on the purchased merchandise as illustrated in FIG. 5, the profile information (the name, the contact address, the payment information such as a credit card number, and so on) on the customer that has been loaded in advance from the mobile terminal 1 of the customer and stored in the memory of the POS device 2, and the information on the store (the store name, the contact address, the cash register number, the name of a cash register handling staff member, and so on) registered in advance in the POS device 2. The generated electronic receipt is transmitted to the addressee within the electronic receipt center 3 on the cloud 30 specified by the customer, or in other words, to the addressee transmitted from the mobile terminal 1 of the customer as the electronic receipt addressee information.

Description of Operation of Embodiment

Next, an example of an operation of the electronic receipt system 10 illustrated in FIG. 1 will be described in detail with a focus on an operation performed in a case in which the weight of purchased merchandise purchased by the customer is obtained with the use of information on an electronic receipt and the weight is presented to the customer by providing a screen display on the mobile terminal 1 of the customer.

Specifically, the customer owns two bags as bags for storing purchased merchandise. Described is a case in which one bag 1 is for storing goods to be carried into an airplane cabin, and the other bag 2 is for storing goods to be checked into a cargo compartment of the airplane. Herein, as indicated in the guideline illustrated in FIG. 16, a maximum of two bags can be checked into the cargo compartment of the airplane, but the assumption in the present embodiment is that the customer does not own a second bag to be checked into the cargo compartment. However, it is needless to say that, even in a case in which a plurality of bags are to be checked into the cargo compartment, such a case can be handled in the same manner.

Figure 6:
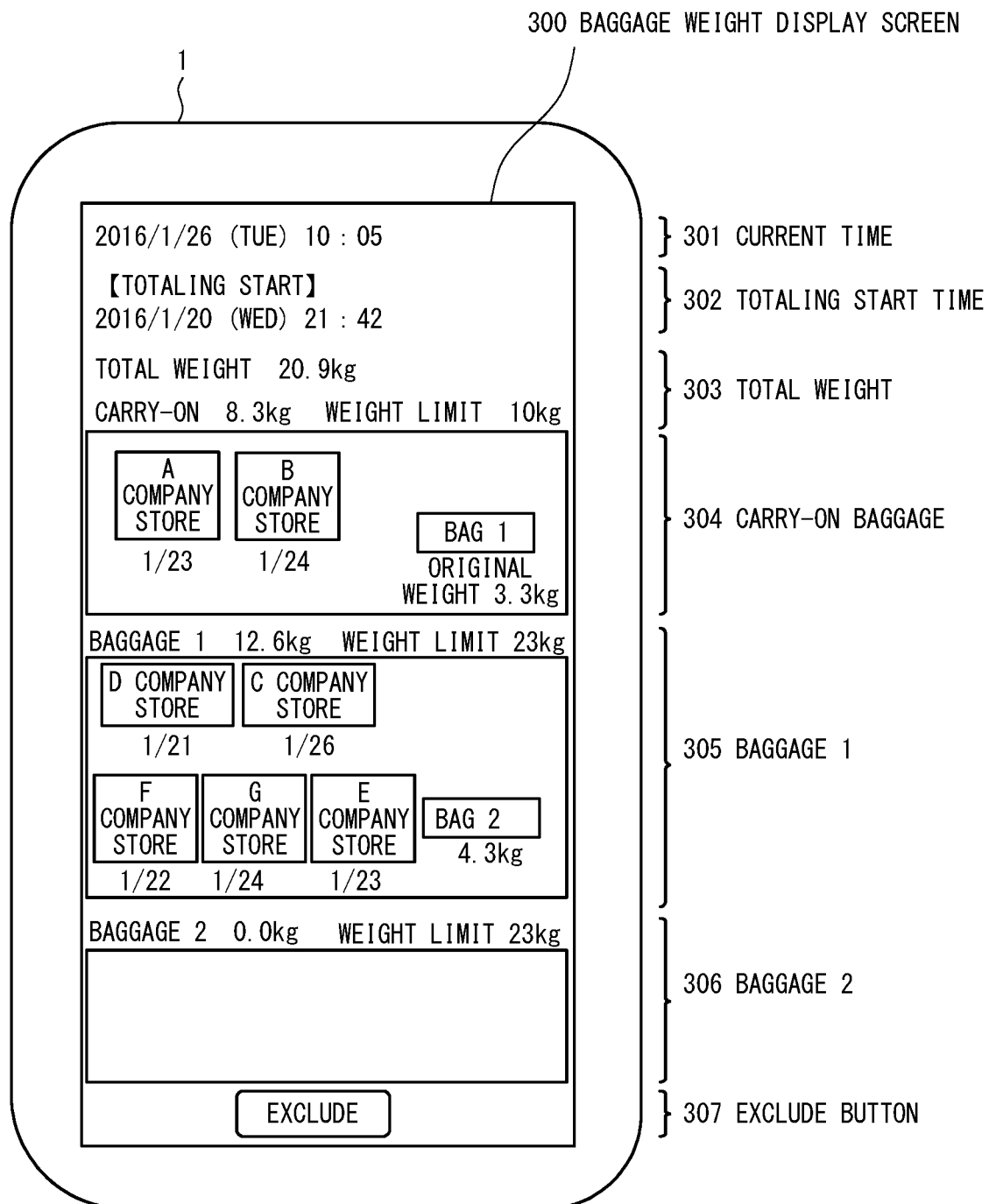
FIG. 6 is a schematic diagram illustrating an example in which the total weight of the weight of the goods stored in the bag 1 to be carried into the airplane cabin, the weight of the goods stored in the bag 2 to be checked into the cargo compartment, and the weight of the bags is displayed on the screen of the mobile terminal of the customer as the baggage weight display screen.

First, a screen display example displayed on the display unit 12 of the mobile terminal 1 according to the present embodiment will be described with reference to FIG. 6. FIG. 6 is a schematic diagram illustrating an example in which the total weight of the weight of the goods stored in the bag 1 to be carried into the airplane cabin, the weight of the goods stored in the bag 2 to be checked into the cargo compartment, and the weight of the bags is displayed on the screen of the mobile terminal 1 of the customer as the baggage weight display screen. The baggage weight display screen 300 illustrated in FIG. 6 provides a screen display of the weight of the goods stored in each of the two bags up to the current time including the weights of the bags along with the weight limit of the carry-on baggage and the weight limit of the cargo-compartment check-in baggage.

The baggage weight display screen 300 illustrated in FIG. 6 is composed of display items including a current time 301, a totaling start time 302, a total weight 303, carry-on baggage 304, cargo-compartment check-in baggage 1 305, cargo-compartment check-in baggage 2 306, and an "exclude" button 307.

Herein, a purchased merchandise icon is being prepared as information for indicating purchased merchandise grouped by the store of purchase and by the date of purchase (a collection of individual pieces of purchased merchandise) when a piece of purchased merchandise is newly stored in the bag after the date set in advance as the initial value in the totaling start time 302. Then, for each of the bags into which the purchased merchandise is stored, the purchased merchandise icon is additionally displayed within a display frame of each of the carry-on baggage 304, the cargo-compartment check-in baggage 1 305, and the cargo-compartment check-in baggage 2 306 displayed in correspondence thereto. Furthermore, at the upper center portion of the display frame of each of the carry-on baggage 304, the cargo-compartment check-in baggage 1 305, and the cargo-compartment check-in baggage 2 306, the total weight of each piece of baggage including the weight of the corresponding storing bag held at the current time indicated in the current time 301 is displayed. Although not illustrated in FIG. 6, the weight of the purchased merchandise purchased at each store of purchase and on each date of purchase (i.e., the total (subtotal) weight of the collection of the individual pieces of merchandise) may be additionally displayed in association with the purchased merchandise icon.

In the display example illustrated in FIG. 6, as described above, illustrated is a case in which the customer has only two bags, namely, the bag 1 to be carried into the airplane cabin and the bag 2 to be checked into the cargo compartment and does not have a bag corresponding to the cargo-compartment check-in baggage 2 306. In addition, illustrated is a state in which merchandise purchased at an A Company Store on January 23 and merchandise purchased at a B Company Store on January 24 are stored in the bag 1 to be carried into the airplane cabin during a period from 21:42 on Jan. 20, 2016 set in the totaling start time 302 to the current time of 10:05 on Jan. 26, 2016 indicated by the current time 301, as indicated by the purchased merchandise icons in the carry-on baggage 304 illustrated in FIG. 6.

Meanwhile, illustrated is a state in which merchandise purchased at a D Company Store on January 21, merchandise purchased at an F Company Store on January 22, merchandise purchased at an E Company Store on January 23, merchandise purchased at a G Company Store on January 24, and merchandise purchased at a C Company Store on January 26 are stored in the bag 2 to be checked into the cargo compartment, as indicated by the purchased merchandise icons in the cargo-compartment check-in baggage 1 305 illustrated in FIG. 6.

As a result, displayed at the upper center portion of the display frame of each of the carry-on baggage 304 and the cargo-compartment check-in baggage 1 305 is that the total weights of the baggage including the weight of the bags are 8.3 kg and 12.6 kg at the current time 301 of 10:05 on Jan. 26, 2016, and displayed in the total weight 303 is that the total weight obtained by adding the two is 20.9 kg.

In each of the carry-on baggage 304, the cargo-compartment check-in baggage 1 305, and the cargo-compartment check-in baggage 2 306, the total weight (original weight) of the weight of the bag itself owned by the customer and the weight of goods stored from the beginning is set in advance as an initial value and displayed in the screen at a lower right corner of each display frame. In the display example illustrated in FIG. 6, indicated at the lower right corner of the display frame of each of the carry-on baggage 304 and the cargo-compartment check-in baggage 1 305 is that the original weight of the bag 1 is 3.3 kg and the original weight of the bag 2 is 4.3 kg. In addition, since the customer does not have a third bag, the display frame of the cargo-compartment check-in baggage 2 306 is left blank.

In addition, the weight limit for each defined by the airplane baggage allowance guideline is displayed as an initial value in the upper right of the display frame of each of the carry-on baggage 304, the cargo-compartment check-in baggage 1 305, and the cargo-compartment check-in baggage 2 306. In the display example illustrated in FIG. 6, as the weight limit defined by the airplane baggage allowance guideline illustrated in FIG. 15 and FIG. 16, a display of 10 kg is provided in the upper right of the display frame of the carry-on baggage 304, and a display of 23 kg is provided in the upper right of the display frame of each of the cargo-compartment check-in baggage 1 305 and the cargo-compartment check-in baggage 2 306. Therefore, the customer who has viewed the baggage weight display screen 300 as illustrated in FIG. 6 can grasp at a glance that the weights of 8.3 kg and 12.6 kg held at the current time 301 of 10:05 on Jan. 26, 2016 displayed at the upper center portion of the display frame of each of the carry-on baggage 304 and the cargo-compartment check-in baggage 1 305 illustrated in FIG. 6 are within the ranges of the respective weight limits.

Figure 7:
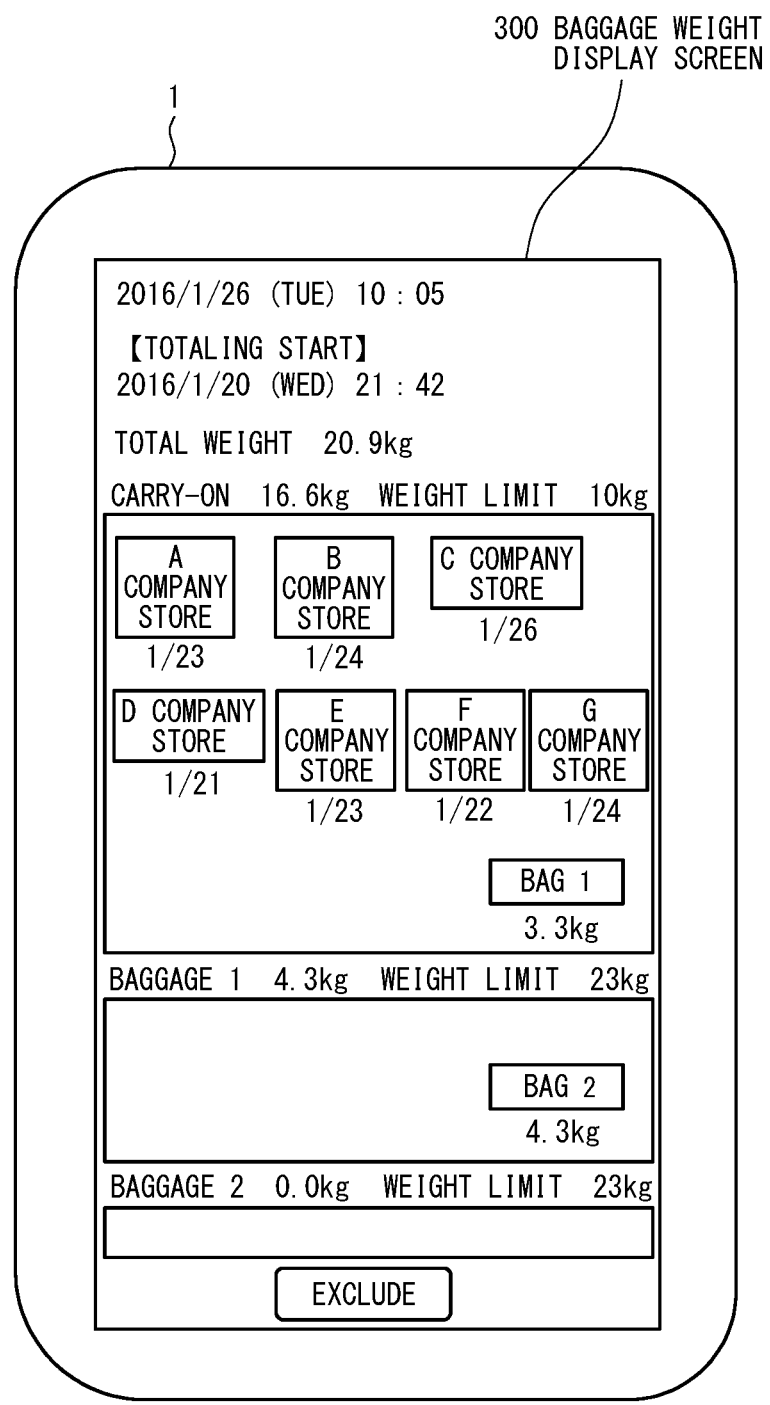
FIG. 7 is a schematic diagram illustrating a screen display example of the baggage weight display screen held in a case in which all the pieces of purchased merchandise are stored, as an initial value, into the bag 1 to be carried into the airplane cabin.

In the following descriptions, the assumption is that the bag for storing the merchandise newly purchased after 21:42 on Jan. 20, 2016 set in the totaling start time 302 is the bag 1 to be carried into the airplane cabin, as set as an initial value. FIG. 7 is a schematic diagram illustrating a screen display example of the baggage weight display screen 300 held in a case in which all the pieces of purchased merchandise are stored, as an initial value, into the bag 1 to be carried into the airplane cabin.

In the initial screen illustrated in FIG. 7, illustrated is a state in which the total weight of the purchased merchandise stored in the bag 1 to be carried into the cabin at the current time of 10:05 on Jan. 26, 2016 is 16.6 kg including the original weight of the bag 1 (including the weight of the items having been stored from the beginning) as displayed at the upper center portion of the display frame of the carry-on baggage 304, and this is over the weight limit of 10 kg. Meanwhile, the bag 2 to be checked into the cargo compartment is empty, and thus the weight of the bag 2 itself, which is 4.3 kg, is displayed at the upper center portion of the display frame of the cargo-compartment check-in baggage 1 305.

Then, the assumption is that, when the customer has confirmed that the bag 1 is over the weight limit of 10 kg for carry-ons through the baggage weight display screen 300 of the mobile terminal 1 or as necessary, the customer discards any piece of merchandise stored in the bag 1 to be carried into the cabin as grouped by the store of purchase and by the date of purchase or repacks the merchandise into the bag 2 to be checked into the cargo compartment. With regard to an operation for the customer to check whether the bag 1 is within the weight limit of 10 kg for carry-ons as a result of discarding or repacking the merchandise, the customer can easily check through a drag and drop operation of the purchased merchandise icon displayed in the display frame of the carry-on baggage 304 of the baggage weight display screen 300 of the mobile terminal 1 of the customer into the display frame of the cargo-compartment check-in baggage 1 305.

In addition, as necessary, it is of course possible to repack merchandise in the opposite direction. In such a case as well, a drag and drop operation of a purchased merchandise icon in the display frame of the cargo-compartment check-in baggage 1 305 of the baggage weight display screen 300 into the display frame of the carry-on baggage 304 makes it possible to simulate a case in which the merchandise is repacked in the opposite direction from the bag 2 to be checked into the cargo compartment to the bag 1 to be carried into the cabin. Then, regardless of the direction of repacking, how the total weight of each has changed can be checked easily.

Figure 8A:
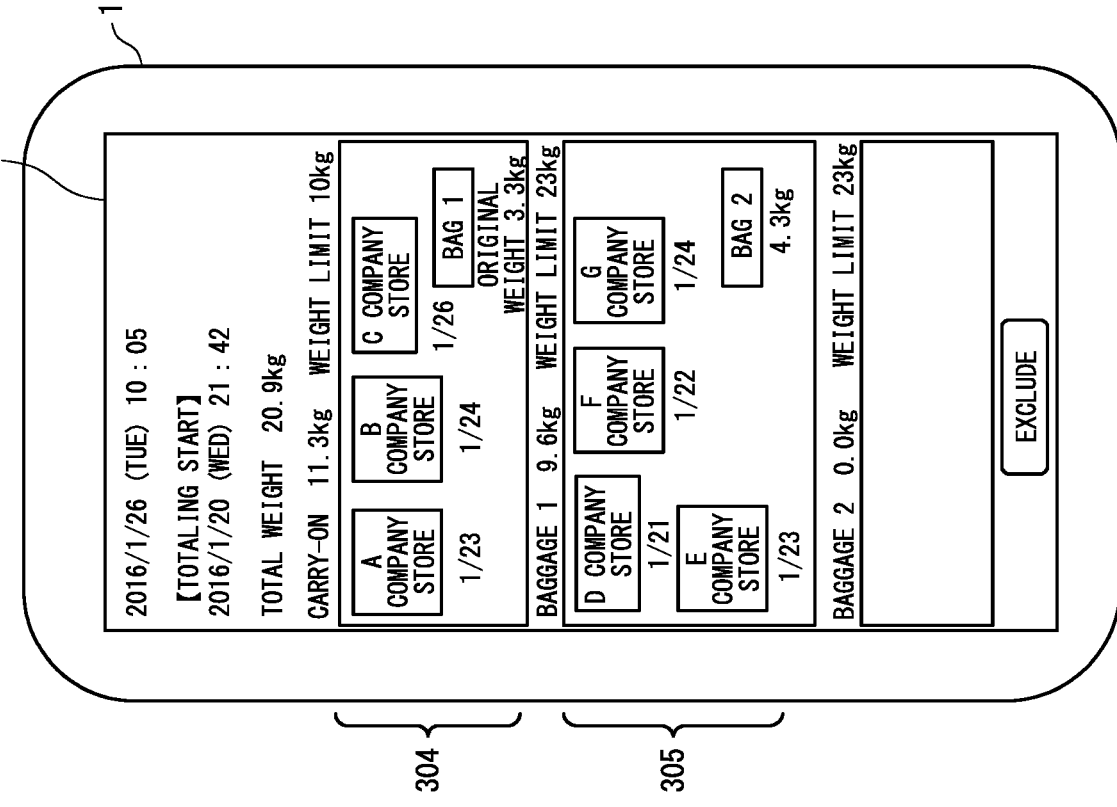
FIG. 8A is a schematic diagram illustrating an example of a procedure for operating the baggage weight display screen of the mobile terminal of the customer.
Figure 8B:
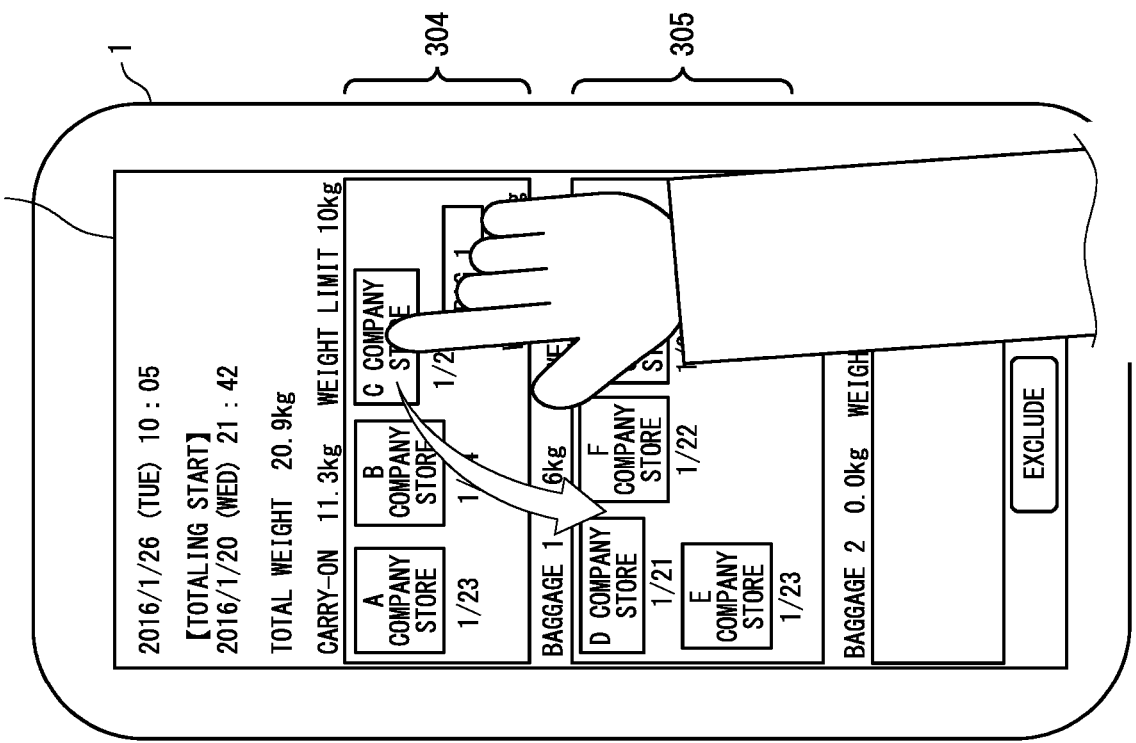
FIG. 8B is a schematic diagram illustrating an example of a procedure for operating the baggage weight display screen 300 of the mobile terminal 1 of the customer.

Next, a procedure for operating the baggage weight display screen 300 of the mobile terminal 1 of the customer will be described with reference to FIG. 8A and FIG. 8B. FIG. 8A and FIG. 8B are each a schematic diagram illustrating an example of a procedure for operating the baggage weight display screen 300 of the mobile terminal 1 of the customer. In the case illustrated in FIG. 8A and FIG. 8B, illustrated is an example of operating the baggage weight display screen 300 when, upon confirming that the bag 1 has exceeded the weight limit of 10 kg for carry-ons, the customer repacks the merchandise purchased at the C Company Store on January 26 from the bag 1 to be carried into the cabin to the bag 2 to be checked into the cargo compartment. FIG. 8A illustrates a screen display example of the baggage weight display screen 300 held before the repacking, and FIG. 8B illustrates a screen display example held during a drag and drop operation for reflecting the state obtained after the repacking.

The screen display example of the baggage weight display screen 300 illustrated in FIG. 8A illustrates a state obtained after each of the merchandise purchased at the D Company Store on January 21, the merchandise purchased at the F Company Store on January 22, the merchandise purchased at the E Company Store on January 23, and the merchandise purchased at the G Company Store on January 24 has been repacked from the bag 1 to be carried into the cabin to the bag 2 to be checked into the cargo compartment from the initial screen of the baggage weight display screen 300 illustrated in FIG. 7.

As illustrated in FIG. 8A, upon the customer confirming that the baggage total weight displayed at the upper center portion of the display frame of the carry-on baggage 304 of the baggage weight display screen 300 is 11.3 kg and is over the weight limit of 10 kg for carry-ons, the customer performs a drag and drop operation as illustrated in FIG. 8B in order to grasp a situation to be obtained in a case in which the merchandise purchased at the C Company Store on January 26 is repacked from the bag 1 to be carried into the cabin to the bag 2 to be checked into the cargo compartment, for example. Herein, the total weight of the merchandise purchased at the C Company Store on January 26 is approximately 3.0 kg as indicated in the example of the electronic receipt illustrated in FIG. 5.

As illustrated in FIG. 8B, the customer carries out a drag and drop operation of the purchased merchandise icon indicating the merchandise purchased at the C Company Store on January 26 present in the display frame of the carry-on baggage 304 of the baggage weight display screen 300 into the display frame of the cargo-compartment check-in baggage 1 305 and moves the purchased merchandise icon indicating the set of merchandise purchased at the C Company Store on January 26 from the display frame of the carry-on baggage 304 to the display frame of the cargo-compartment check-in baggage 1 305.

As a result, the display content of the baggage weight display screen 300 illustrated in FIG. 8A and FIG. 8B is changed to the display content of the baggage weight display screen 300 illustrated in FIG. 6, the total weight of each of the bag 1 and the bag 2 is recalculated, the total weight of 8.3 kg is displayed at the upper center portion of the display frame of the carry-on baggage 304, and the total weight of 12.6 kg is displayed at the upper center portion of the display frame of the cargo-compartment check-in baggage 1 305. Thus, the customer can confirm that the carry-on baggage and the cargo-compartment check-in baggage both fall within the ranges of the respective weight limits.

Accordingly, the customer repacks the merchandise purchased at the C Company Store on January 26 from the bag 1 to be carried into the cabin to the bag 2 to be checked into the cargo compartment in accordance with the changed display content of the baggage weight display screen 300 illustrated in FIG. 6.

In other words, as described in detail thus far, in the present embodiment, the weight of the goods stored into the bag 1 to be carried into the cabin and the bag 2 to be checked into the cargo compartment can be totaled after the date and the time set in the totaling start time 302 of the baggage weight display screen 300. In addition, only by moving a purchased merchandise icon displayed as grouped by the store of purchase and by the date of purchase between the display frame of the carry-on baggage 304 of the baggage weight display screen 300 and the display frame of the cargo-compartment check-in baggage 1 305, the customer can easily grasp the total weight of the merchandise purchased on the date of purchase and at the store of purchase corresponding to the purchased merchandise icon.

As described above, if the total weight of the individual pieces of merchandise purchased as grouped by store of purchase and by the date of purchase, namely, if the weight of the purchased merchandise is displayed on the baggage weight display screen 300 associated with a purchased merchandise icon, the customer can simply determine which piece of merchandise is to be moved or discarded to resolve the state in which a bag is over the weight limit only by viewing the baggage weight display screen 300.

In the screen operation example of the baggage weight display screen 300 illustrated in FIG. 6, FIG. 8A, and FIG. 8B, described is an example in which a set of merchandise purchased as grouped by the store of purchase and by the date of purchase is displayed in the form of a purchased merchandise icon and a change in the total weight of each of the bag 1 to be carried into the cabin and the bag 2 to be checked into the cargo compartment associated with a movement of the purchased merchandise icon is checked. The present disclosure, however, is not limited to such a case. Specifically, each individual piece of merchandise included in a set of merchandise purchased as grouped by the store of purchase and by the date of purchase may be displayed individually as a baggage weight display screen 300, and only a specific piece of merchandise thereamong may be moved between the display frame of the carry-on baggage 304 and the display frame of the cargo-compartment check-in baggage 1 305 or may be discarded, as necessary, Thus, a change in the total weight of each of the bag 1 to be carried into the cabin and the bag 2 to be checked into the cargo compartment can be checked.

Figure 9A:
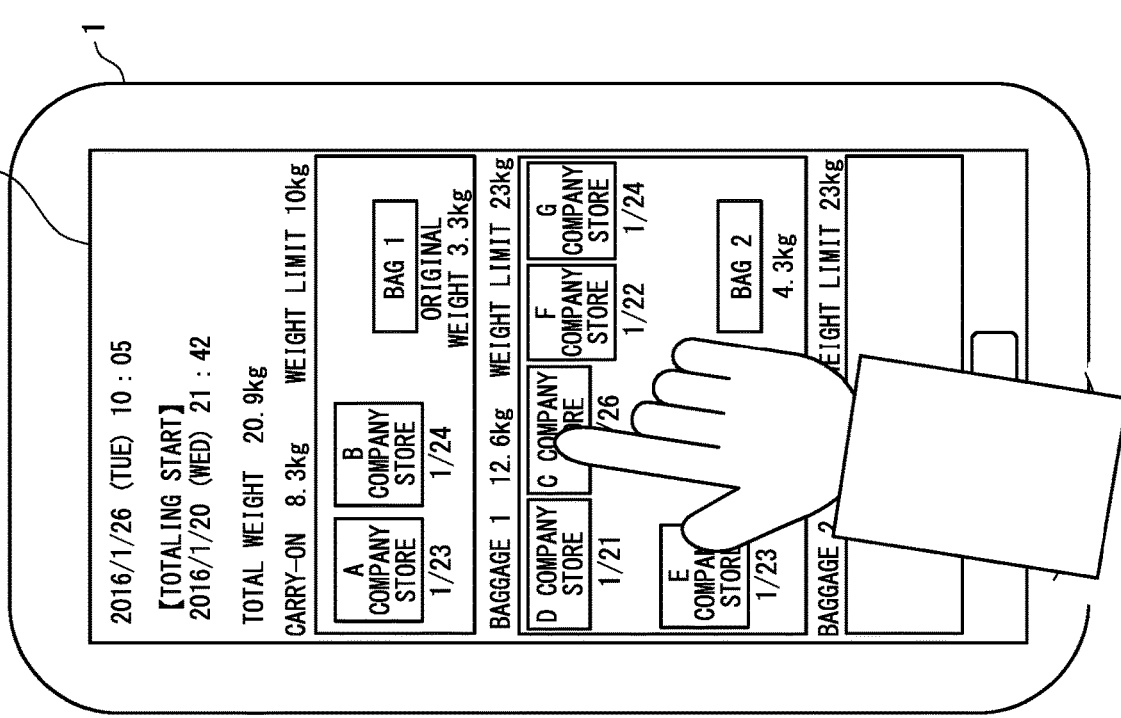
FIG. 9A is a schematic diagram illustrating an example of a procedure for operating the baggage weight display screen of the mobile terminal of the customer, and this example is different from that illustrated in FIG. 8A and FIG. 8B.
Figure 9B:
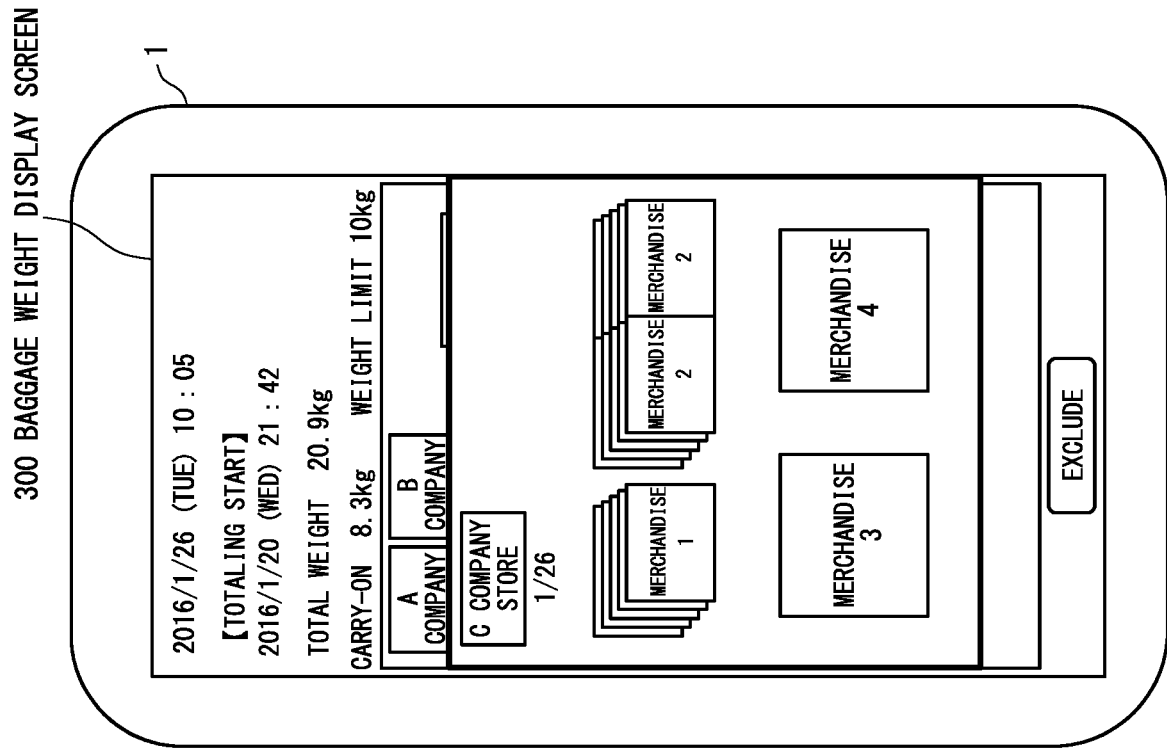
FIG. 9B is a schematic diagram illustrating an example of a procedure for operating the baggage weight display screen of the mobile terminal of the customer, and this example is different from that illustrated in FIG. 8A and FIG. 8B.

FIG. 9A and FIG. 9B are schematic diagrams illustrating an example of a procedure for operating the baggage weight display screen 300 of the mobile terminal 1 of the customer, and this example is different from that illustrated in FIG. 8A and FIG. 8B. FIG. 9A and FIG. 9B illustrate an example in which the customer performs a tapping (or clicking) operation of a purchased merchandise icon indicating a set of merchandise purchased as grouped by the store of purchase and by the date of purchase to display individual pieces of merchandise constituting the set of merchandise corresponding to the purchased merchandise icon. FIG. 9A illustrates a screen display example of a state in which a tapping (or clicking) operation is performed on the purchased merchandise icon indicating the set of merchandise purchased at the C Company Store on January 26 present in the display frame of the cargo-compartment check-in baggage 1 305, and FIG. 9B illustrates a screen display example of a case in which the individual pieces of merchandise of the set of merchandise constituting the purchased merchandise purchased at the C Company Store on January 26 by the tapping (or clicking) operation are all displayed at once in the form of individual merchandise icons.

In other words, as illustrated in FIG. 9A, upon the customer performing a tapping (or clicking) operation of the purchased merchandise icon indicating the set of merchandise purchased at the C Company Store on January 26 displayed on the baggage weight display screen 300 of the mobile terminal 1 of the customer, as illustrated in FIG. 9B, the display frame for the C Company Store on January 26 is enlarged, and four types of merchandise constituting the purchased merchandise (i.e., the set of individual pieces of merchandise) purchased at the C Company Store on the stated date, or in other words, each of the merchandise 1, the merchandise 2, the merchandise 3, and the merchandise 4 is displayed in the form of an individual merchandise icon. Herein, the display example of the individual merchandise icons illustrated in FIG. 9B illustrates individual pieces of merchandise purchased at the C Company Store on January 26 indicated on the electronic receipt illustrated in FIG. 5.

In addition, the individual merchandise icons illustrated in FIG. 9B are displayed individually so as to correspond to the respective pieces of the purchased merchandise, and as illustrated in FIG. 5, the total of seventeen icons are displayed: five individual merchandise icons for the merchandise 1 (e.g., cosmetics), ten individual merchandise icons for the merchandise 2 (e.g., medicine), one individual merchandise icon for the merchandise 3 (e.g., fever-relieving sheet), and one individual merchandise icon for the merchandise 4 (e.g., drinking water). In other words, as the customer performs a drag and drop operation of each individual merchandise icon as necessary, the customer can delete the individual pieces of merchandise one by one or can repack the individual pieces of merchandise.

Figure 10A:
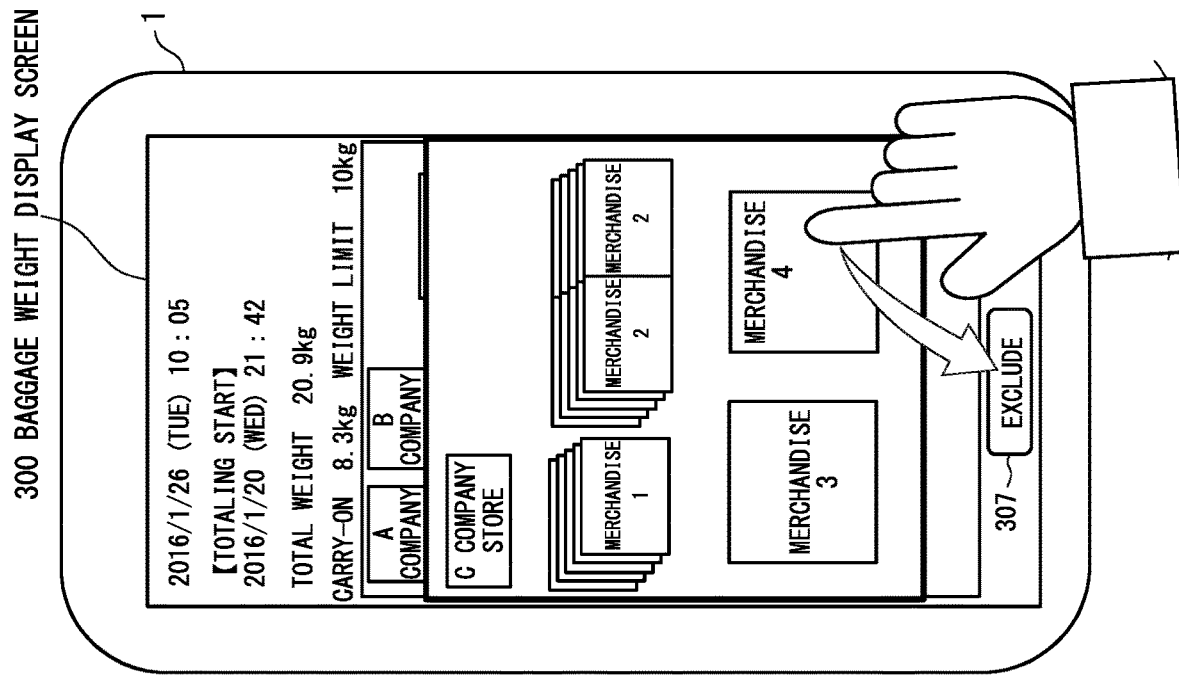
FIG. 10A is a schematic diagram illustrating an example of a procedure for operating the baggage weight display screen of the mobile terminal of the customer, and this example is different from those illustrated in FIG. 8A, FIG. 8B, FIG. 9A, and FIG. 9B.
Figure 10B:
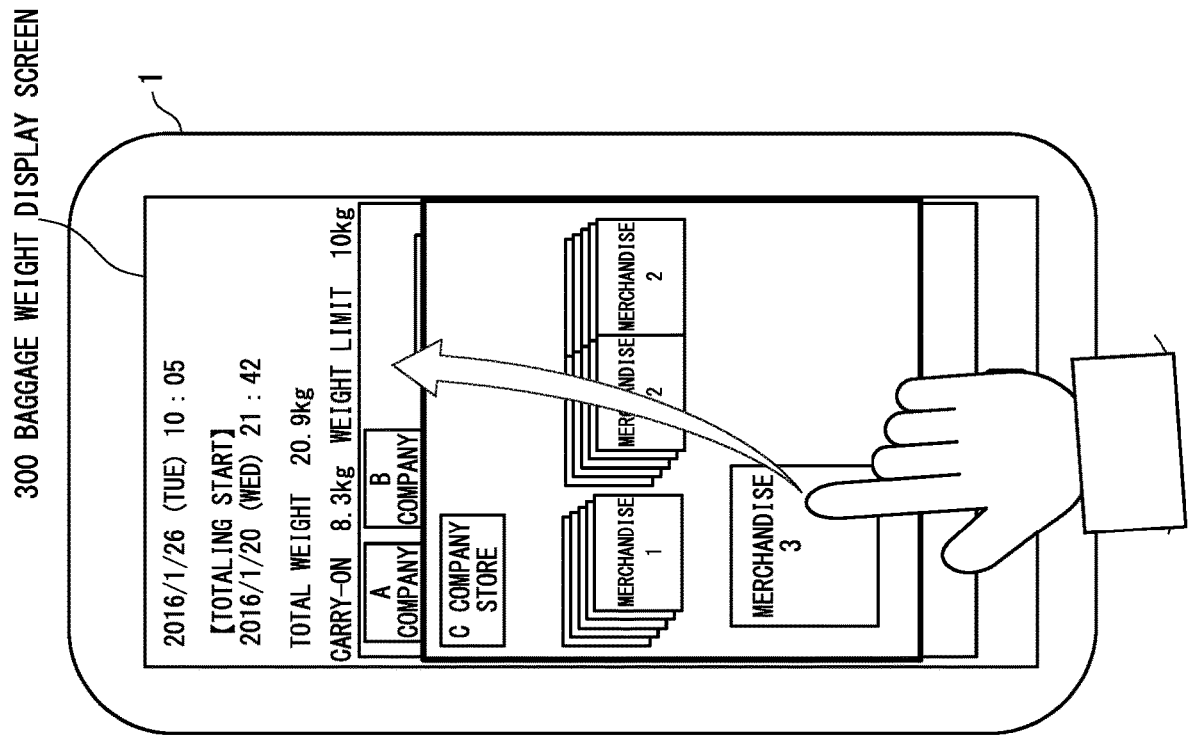
FIG. 10B is a schematic diagram illustrating an example of a procedure for operating the baggage weight display screen of the mobile terminal of the customer, and this example is different from those illustrated in FIG. 8A, FIG. 8B, FIG. 9A, and FIG. 9B.

Next, an operation example of a case in which a specific piece of merchandise is selected from the individual pieces of merchandise displayed all at once in the form of the individual merchandise icons in FIG. 9B and the selected piece of merchandise is discarded or stored into a different bag will be described with reference to FIG. 10A and FIG. 10B. FIG. 10A and FIG. 10B are schematic diagrams illustrating an example of a procedure for operating the baggage weight display screen of the mobile terminal 1 of the customer, and this example is different from those illustrated in FIG. 8A, FIG. 8B, FIG. 9A, and FIG. 9B. FIG. 10A and FIG. 10B illustrate a screen operation example of a case in which a specific individual piece of merchandise among the individual pieces of merchandise constituting the set of merchandise purchased as grouped by the date of purchase and by the store of purchase displayed on the baggage weight display screen 300 is discarded or moved to a different bag.

As illustrated in FIG. 10A, among the individual pieces of merchandise displayed all at once in the form of the individual merchandise icons in FIG. 9B, the merchandise 4, or the drinking water, for example, cannot be carried into the airplane cabin, and thus the individual merchandise icon "merchandise 4" indicating the stated individual piece of merchandise is dragged and dropped onto the "exclude" button 307 and deleted from the purchased merchandise to be loaded onto the airplane. Then, for example, after the customer finishes drinking the drinking water corresponding to the merchandise 4, the customer discards the containing bottle of the drinking water. The weight of the merchandise 4, or the drinking water, is approximately 0.1 kg, as indicated on the electronic receipt illustrated in FIG. 5, and as a result of discarding the merchandise 4, the overall total weight of 20.9 kg indicated in the total weight 303 of the baggage weight display screen 300 is reduced slightly by the weight of the merchandise 4 and results in 20.8 kg.

In addition, as illustrated in FIG. 10B, with regard to the merchandise 3, or the fever-relieving sheet, for example, in consideration of a possibility that the merchandise 3 is used in the airplane cabin after boarding, in order to repack the merchandise 3 to the bag 1 to be carried into the cabin, the individual merchandise icon "merchandise 3" indicating the stated individual piece of merchandise is dragged and dropped onto the display frame of the carry-on baggage 304 to be moved into the display frame of the carry-on baggage 304. Then, the fever-relieving sheet, or the "merchandise 3," is repacked from the bag 2 to be checked into the cargo compartment to the bag 1 to be carried into the cabin. The weight of the merchandise 3, or the fever-relieving sheet, is approximately 0.5 kg, as indicated on the electronic receipt illustrated in FIG. 5, and as a result of the repacking, the total weight of 8.3 kg of the carry-on baggage indicated at the upper center portion of the display frame of the carry-on baggage 304 of the baggage weight display screen 300 is increased slightly by the weight of the merchandise 3 and results in 8.8 kg. Meanwhile, the total weight of 12.6 kg of the cargo-compartment check-in baggage indicated at the upper center portion of the display frame of the cargo-compartment check-in baggage 1 305 is reduced by a total of 0.6 kg as the merchandise 4 is discarded and the merchandise 3 is moved and results in 12.0 kg.

Figure 11:
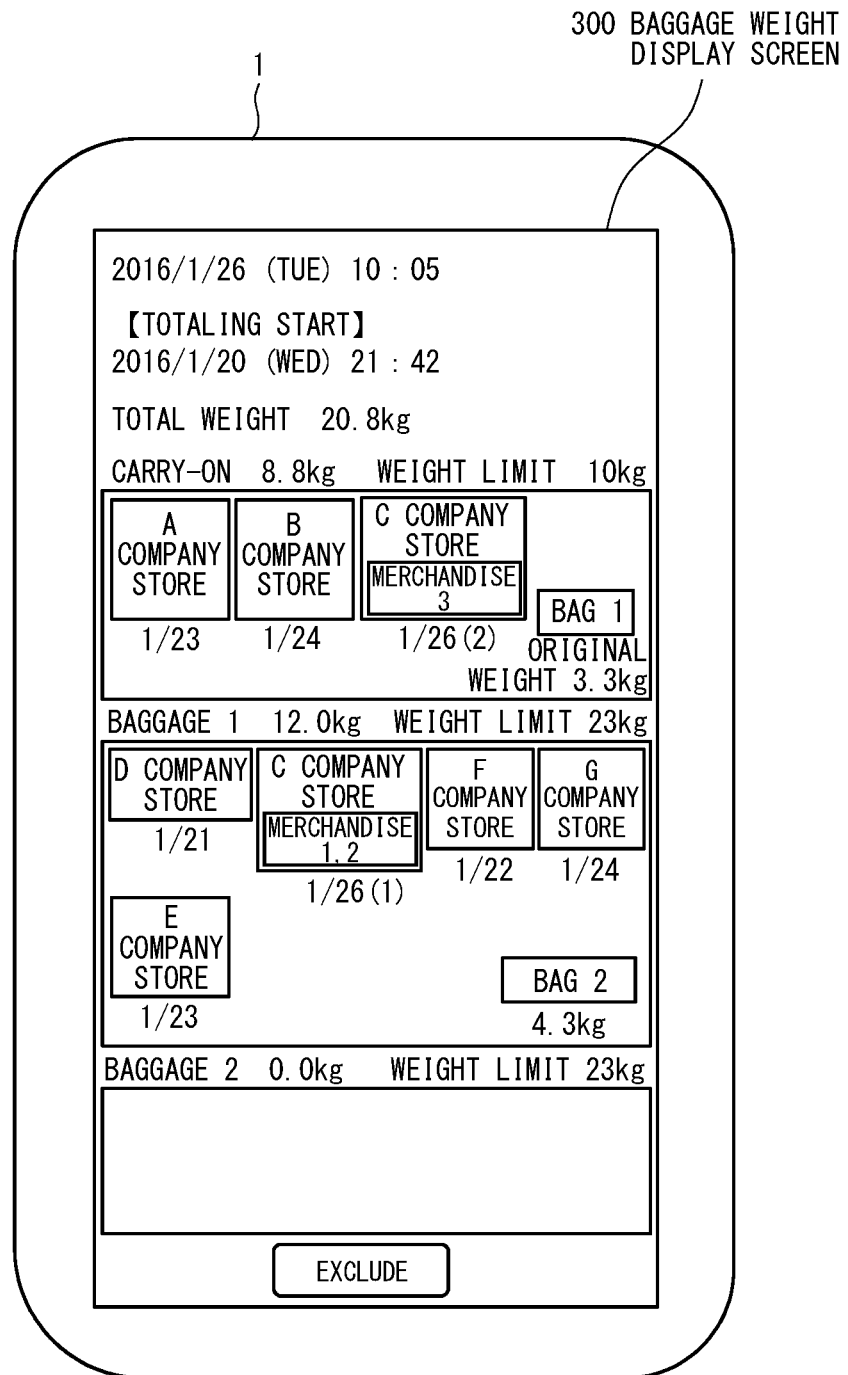
FIG. 11 is a schematic diagram illustrating a screen display example of the baggage weight display screen that reflects the results of the operations illustrated in FIG. 10A and FIG. 10B.

FIG. 11 is a schematic diagram illustrating a screen display example of the baggage weight display screen 300 that reflects the results of the operations illustrated in FIG. 10A and FIG. 10B. As illustrated in FIG. 11, as a result of the deleting and moving operations illustrated in FIG. 10A and FIG. 10B, the combined total weight of the bag 1 to be carried into the cabin and the bag 2 to be checked into the cargo compartment is 20.8 kg, and the total weights of the bag 1 to be carried into the cabin and the bag 2 to be checked into the cargo compartment are 8.8 kg and 12.0 kg, respectively. In other words, this indicates that the stated total weights fall within the ranges of the respective weight limits for the bag 1 to be carried into the cabin and the bag 2 to be checked into the cargo compartment defined by the airplane baggage allowance guideline illustrated in FIG. 15 and FIG. 16.

In the screen operation illustrated in FIG. 10A and FIG. 10B, of the set of merchandise purchased at the C Company Store on January 26, a portion of the individual pieces of merchandise (i.e., the merchandise 4) is discarded, another portion of the individual pieces of merchandise (i.e., the merchandise 3) is repacked to the bag 1 to be carried into the cabin, and the remaining merchandise is kept being stored in the bag 2 to be checked into the cargo compartment. Accordingly, in the display example illustrated in FIG. 11, a purchased merchandise icon for the merchandise from the C Company with a suffix appended to the date of purchase, as in January 26(1), is displayed in the display frame of the cargo-compartment check-in baggage 1 305, and a purchased merchandise icon indicating that only a portion of the individual pieces of merchandise (i.e., the merchandise 3) of the merchandise from the C Company is displayed as the date of purchase with a suffix appended thereto, as in January 26(2), in the display frame of the carry-on baggage 304, in order to indicate that these icons are for the portions left after dividing the individual pieces of merchandise. However, the purchased merchandise icons are not limited to such a display, and any icon display that can indicate that the merchandise has been divided may be used.

Figure 14:
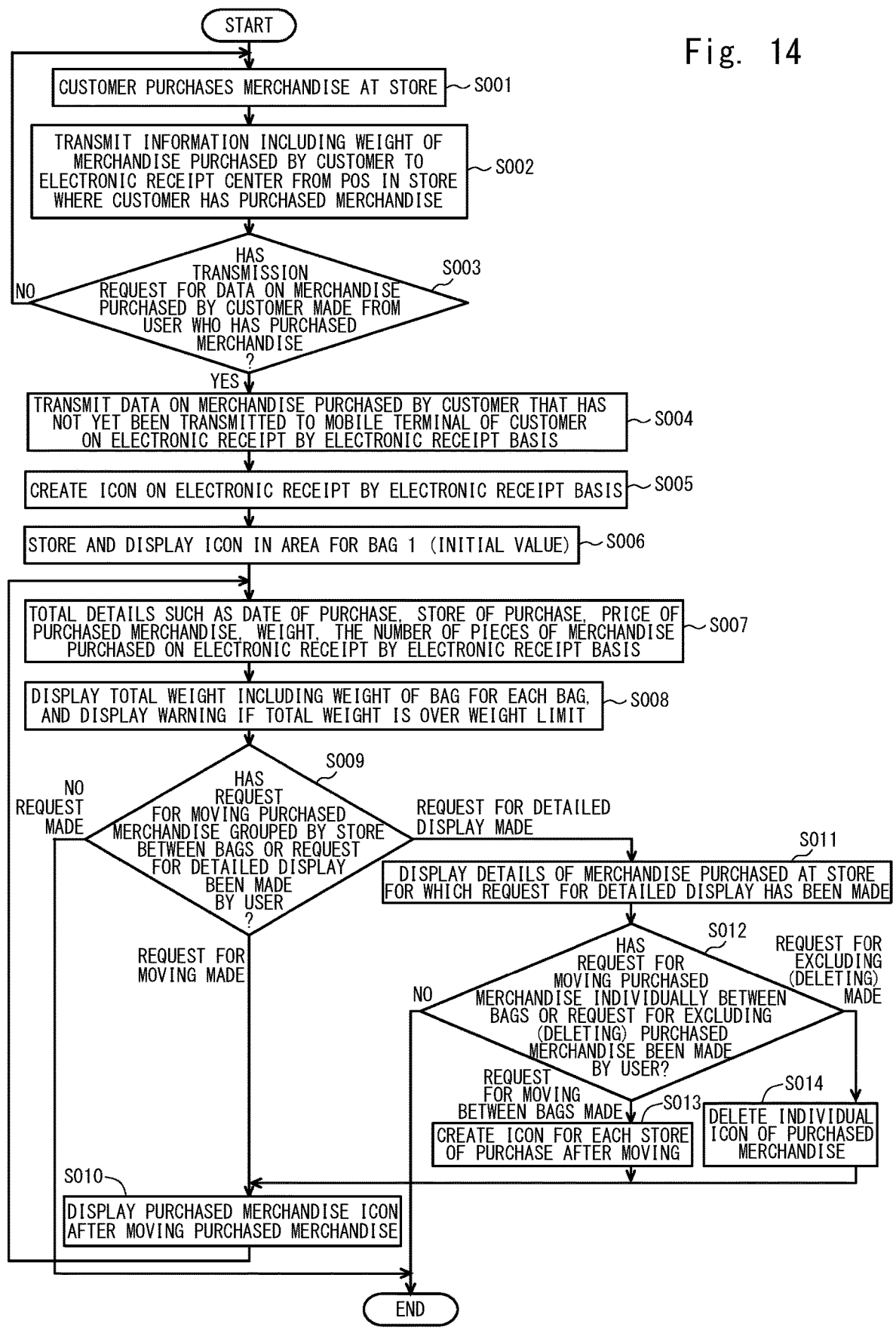
FIG. 14 is a flowchart illustrating an operation according to an embodiment of the present disclosure.

Next, an operation method according to an embodiment of the present disclosure will be described with reference to the flowchart illustrated in FIG. 14. First, a user purchases merchandise (step S001). Upon a POS at a store where the customer is making the purchase finishing a checkout process, the POS issues a receipt and also transmits merchandise information including the data on the weight of the merchandise purchased by the customer to the electronic receipt center 3 in the form of an electronic receipt (step S002). The electronic receipt center 3 monitors whether a transmission request for the data on the purchased merchandise has been made by the customer (step S003). If a transmission request for the information on the purchased merchandise is made by the customer, the electronic receipt center 3 transmits the information on the purchased merchandise that has not yet been transmitted to the mobile terminal 1 of the customer who has made the request on an electronic receipt by electronic receipt basis to that mobile terminal 1 (step S004). Upon receiving the information on the purchased merchandise on an electronic receipt by electronic receipt basis, the mobile terminal 1 creates an icon on an electronic receipt by electronic receipt basis (step S005). The mobile terminal 1 displays the icon created in step S005 in an area for the bag 1 serving as an initial value as illustrated in FIG. 7 (step S006). The mobile terminal 1 totals the detailed data such as the date of purchase, the store of purchase, the price of the purchased merchandise, the weight, the number of pieces of merchandise purchased on an electronic receipt by electronic receipt basis as illustrated in FIG. 5 (step S007). The customer terminal displays the total weight including the weight of the bag for each of the bags as illustrated in FIG. 7 (step S008). At this point, in a case in which the baggage is over the weight limit, a warning is provided by changing the background color or the like. In order to prevent the bag from being over the weight limit as warned in step S008 or in accordance with the circumstances of transportation, the customer terminal waits for a request for a simulation on a movement of the purchased merchandise between the storing bags on an electronic receipt by electronic receipt basis as illustrated in FIG. 8B or a request for displaying individual pieces of merchandise as illustrated in FIG. 9A in order for a simulation on the movement of individual pieces of merchandise included in an electronic receipt, instead of on an electronic receipt by electronic receipt basis (step S009). In a case in which a request for moving the merchandise on an electronic receipt by electronic receipt basis has been made, the icon is moved as illustrated in FIG. 6 (step S010), and the operation returns to the calculation of the weight of each bag (step S008). In a case in which a request for displaying the individual pieces of merchandise has been made in step S009, the icons for the individual pieces of merchandise are displayed as illustrated in FIG. 9B (step S011). After displaying the icons for the individual pieces of merchandise, the mobile terminal 1 waits, from the customer, for a request for moving an individual piece of merchandise between the bags as illustrated in FIG. 10B or a request for deleting an individual piece of merchandise as illustrated in FIG. 10A (step S012). The request for deleting an individual piece of merchandise is made in a case in which the customer has used up a piece of purchased merchandise or has finished drinking the merchandise if the merchandise is a beverage. After finishing each process, the operation moves to the icon display screen of step S010. In a case in which no request is made from the customer within a set time in step S009 or in step S012, the mobile terminal 1 enters a resume state or suspends the processing. In the foregoing processing, the processing in and after step S006 has been described as the processing in the mobile terminal 1, but the totaling processing may be carried out in the electronic receipt center 3, and only the display processing may be carried out in the mobile terminal 1. In addition, the present disclosure can be implemented with the use of a terminal device that is not portable, such as various types of information processing devices including a desktop personal computer, in place of the mobile terminal 1 according to the foregoing embodiment.

Description of Advantageous Effects of Embodiment

As described in detail thus far, the embodiment according to the present disclosure allows a customer using an airplane to easily check the total weight of the merchandise purchased by the customer by operating the mobile terminal 1 of the customer that is owned by the customer to use the electronic receipt system in advance prior to going through the procedures for boarding the airplane. Therefore, on occurrence of an excess fee incurred due to the weight of the baggage being over the baggage weight limit while going through the airplane boarding procedures can be prevented.

Other Embodiments of the Present Disclosure

In the embodiment described above, whether the weight of the purchased merchandise is over the weight limit defined by the airplane baggage allowance guideline is checked in advance with the use of the electronic receipt system. However, in the present disclosure, not only the weight of the purchased merchandise but also information on the dimensions of the purchased merchandise can be incorporated. In other words, a mechanism that warns the customer that the purchased merchandise cannot be stored in the bag 1 or the bag 2 in a case in which such a situation is suspected by referring to the information on the dimensions (size) of the purchased merchandise can be provided.

Furthermore, the weight or the dimensions (size) of the purchased merchandise can be checked not only after the merchandise is purchased but also before the merchandise is purchased. For example, before purchasing merchandise, the customer operates the mobile terminal 1 to read a merchandise code affixed to the merchandise and acquires the weight or the dimensions of the merchandise in advance with the use of the electronic receipt system 10. Thereafter, the customer may enter the number of pieces of merchandise to be purchased and check the weight or the dimensions (size)

on the basis of the result of simulating the total of the weights or the dimensions (sizes) of the merchandise to be purchased in the intended number of pieces prior to making the purchase.

A specific example of examining whether the purchased merchandise meets the dimensions (size) that can be stored in a bag will now be described. At a store that sells merchandise, a merchandise database server storing a database of merchandise information as illustrated in FIG. 4 is typically provided as the PLU table 200 within the store 20, and as illustrated in Table 1 below, not only the unit price of the merchandise but also the data on the weight of the merchandise and the volume (size) of the merchandise are registered in association with the merchandise code affixed to each piece of merchandise in the form of a barcode.

TABLE 1

| Merchandise Code | Merchandise Name | Unit Price (yen) | Weight (g) | Volume (ml) |
| --- | --- | --- | --- | --- |
| 4901085167014 | Merchandise A | 135 | 400 | 300 |
| 4580360130808 | Merchandise B | 88 | 2050 | 2010 |

Then, when the process of issuing an electronic receipt for the purchased merchandise is carried out in the POS device 102 installed in the store 20, not only the unit price of the purchased merchandise but also the data on the weight and the volume of the purchased merchandise is acquired by accessing the aforementioned merchandise database server, and the electronic receipt for the purchased merchandise can be generated.

Accordingly, the electronic receipt center 3, serving as a center device, in the electronic receipt system 10 can acquire and store, in the form of an electronic receipt, information on the monetary amount paid for the purchased merchandise as well as information on the weight and the volume of the purchased merchandise transmitted from the POS device 2 installed in the store 20.

In addition, the customer registers in advance the volume of the bag used to store purchased merchandise into the mobile terminal 1 used by the customer as illustrated in Table 2 below.

TABLE 2

| Type of Bag | Volume (l) |
| --- | --- |
| Bag 1 | 60 |
| Bag 2 | 95 |

Figure 12A:
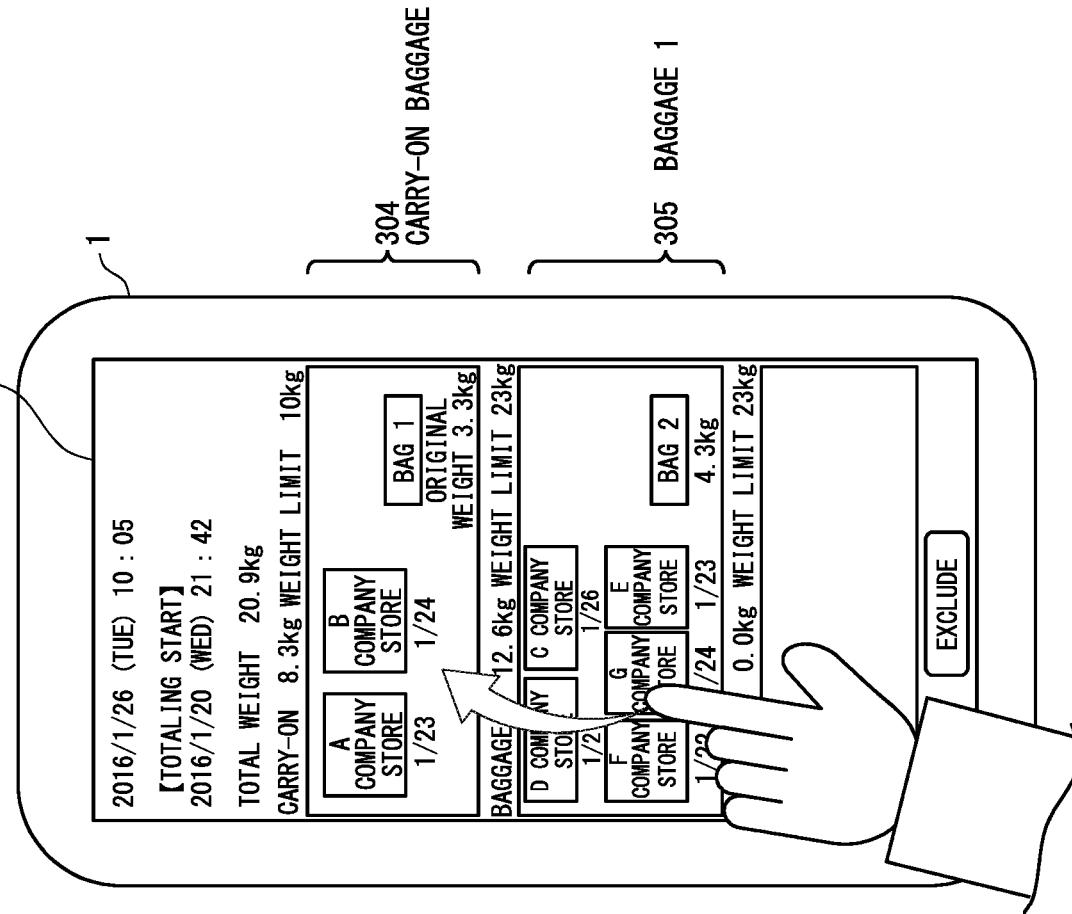
FIG. 12A is a schematic diagram illustrating an example of an operation procedure of the baggage weight display screen of the mobile terminal of the customer according to another embodiment.
Figure 12B:
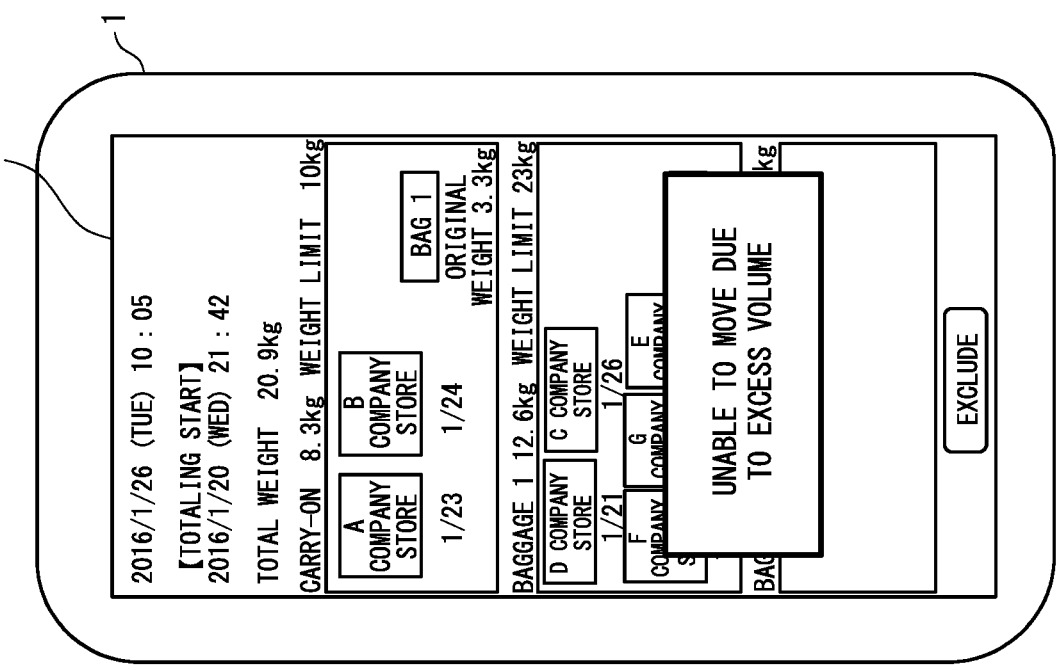
FIG. 12B is a schematic diagram illustrating an example of an operation procedure of the baggage weight display screen of the mobile terminal of the customer according to another embodiment.

When the customer is to change the bag into which the purchased merchandise is stored, the customer acquires the electronic receipt information of the customer from the electronic receipt center 3, displays the baggage weight display screen 300 on the mobile terminal 1 of the customer as illustrated in FIG. 12A and FIG. 12B, and performs a drag and drop operation of the purchased merchandise icon indicating the purchased merchandise to be moved. FIG. 12A and FIG. 12B are schematic diagrams illustrating an example of an operation procedure of the baggage weight display screen 300 of the mobile terminal 1 of the customer according to another embodiment and illustrate a case in which whether the bag for storing the merchandise can be changed is determined on the basis of whether the merchandise is within the volume of the bag.

FIG. 12A illustrates a state in which a drag and drop operation has been performed on the purchased merchandise icon indicating the merchandise purchased at the G Company Store on January 24 present in the display frame of the cargo-compartment check-in baggage 1 305 of the baggage weight display screen 300 into the display frame of the carry-on baggage 304 in order to repack the merchandise from the G Company purchased on January 24 from the bag 2 to be checked into the cargo compartment to the bag 1 to be carried into the cabin from the storage state of the purchased merchandise indicated in the baggage weight display screen 300 illustrated in FIG. 6. In addition, FIG. 12B illustrates a state in which, if the merchandise from the G Company purchased on January 24 is repacked to the bag 1 to be carried into the cabin, the volume of the bag 1 to be carried into the cabin exceeds the possible storage volume, and thus a warning screen stating "unable to move due to excess volume" is displayed to call the attention to the repacking.

In other words, the customer who is to repack the merchandise accesses the electronic receipt center 3 on the cloud 30 with the use of the address data indicating the addressee of the electronic receipt for the purchased merchandise purchased by the customer by operating the mobile terminal 1 of the customer and receives the data on the electronic receipt for the purchased merchandise purchased by the customer.

The customer extracts information on the volume of the purchased merchandise on which a drag and drop operation is to be performed on the baggage weight display screen 300 as illustrated in FIG. 12A from the information on the volume of the purchased merchandise included in the received electronic receipt, totals the volume of the merchandise from the A Company and the volume of the merchandise from the B Company that are already stored in the bag 1 to be carried into the cabin, and compares the total with the volume of the bag 1 to be carried into the cabin registered in advance in the mobile terminal 1 of the customer. As a result, in a case in which it is determined that not all the merchandise can be stored in the bag 1 to be carried into the cabin, as illustrated in FIG. 12B, a warning screen stating "unable to move due to excess volume" is displayed to call the customer's attention to refrain from repacking.

Figure 13A:
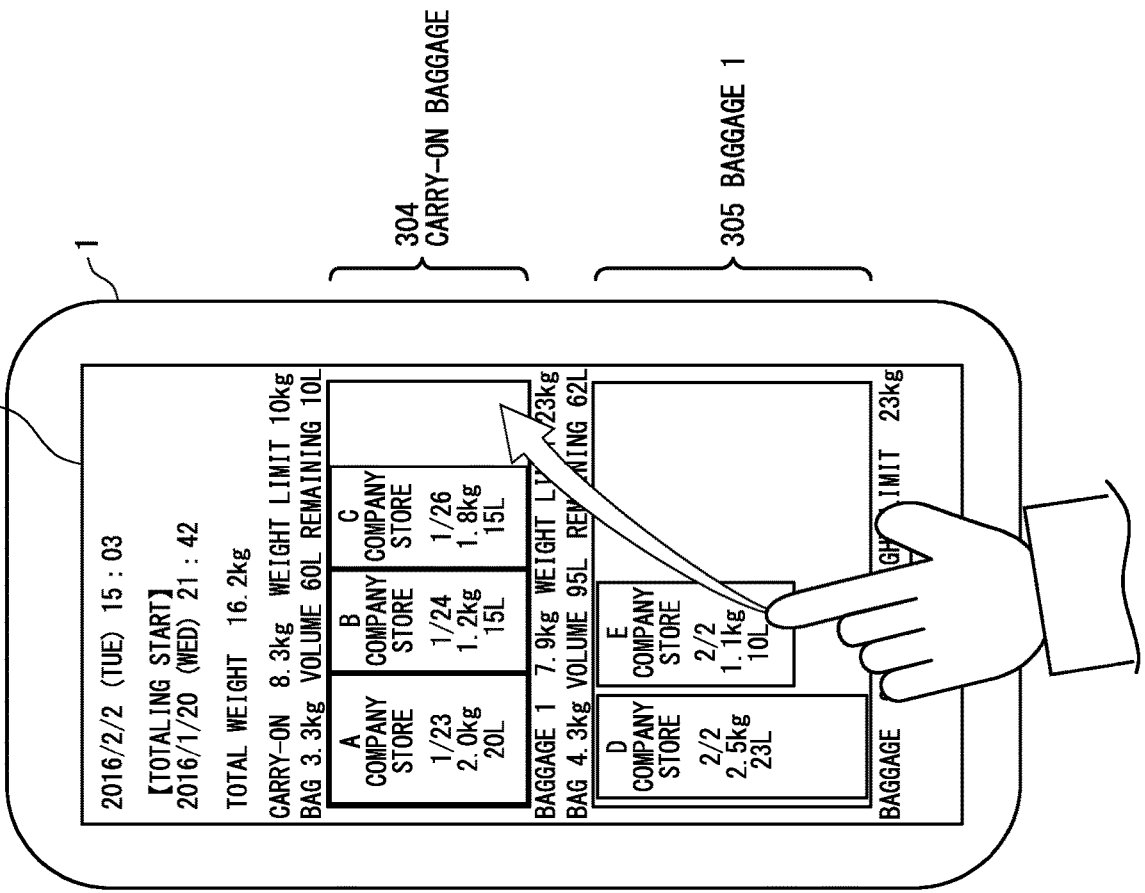
FIG. 13A is a schematic diagram illustrating an operation procedure of a display screen of the baggage weight and the volume of the mobile terminal of the customer.
Figure 13B:
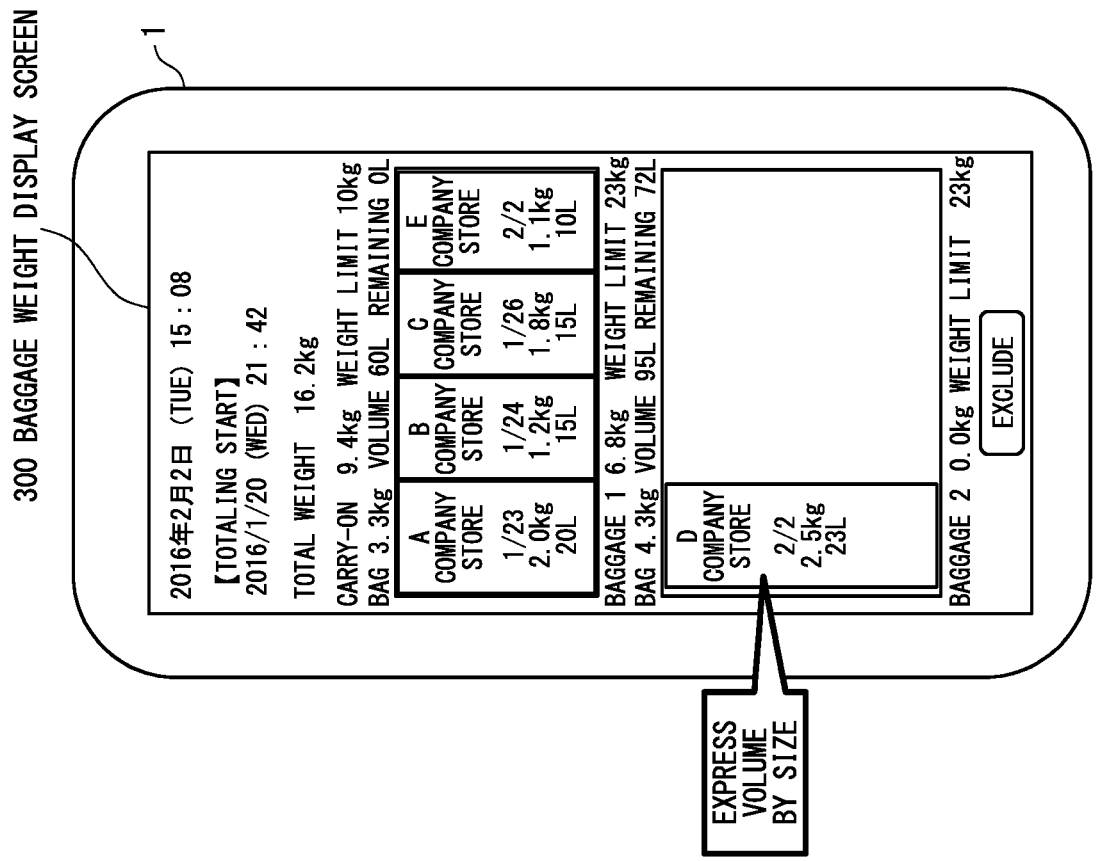
FIG. 13B is a schematic diagram illustrating an operation procedure of a display screen of the baggage weight and the volume of the mobile terminal of the customer.

When, in the baggage weight display screen 300 illustrated in FIG. 12A and FIG. 12B, the volume (size) of the bag 1 to be carried into the cabin and the volume (size) of the bag 2 to be checked into the cargo compartment are displayed, the total volume (the total size) of the goods stored in each of the bag 1 and the bag 2 at the current moment is displayed, and the information on the volume (size) of each piece of purchased merchandise corresponding to each purchased merchandise icon is also displayed, the displays illustrated in FIG. 13A and FIG. 13B are obtained. In FIG. 13A and FIG. 13B, the information on the volume (size) of each piece of purchased merchandise is expressed by the size of the icon as well, and thus the customer can easily check whether repacking is possible only by viewing the screen display. Herein, even in a case in which the information on the volume (size) is displayed on the screen, it is further desirable that the information on the weight can also be displayed alongside on the screen as illustrated in FIG. 13A and FIG. 13B.

In addition, even in a case in which whether the weight of the merchandise to be purchased at a later time meets the weight that can be loaded into the airplane is simulated or whether the merchandise to be purchased at a later time can be stored in the bag 1 or the bag 2 is simulated, as described above, displaying both the information on the weight at the current moment and the information on the volume (size) on a screen facilitates the simulation. In other words, the customer can easily carry out a simulation only by viewing the screen of the mobile terminal 1 by acquiring, in advance prior to making a purchase, the weight and the volume (size) of the merchandise to be purchased at a later time with the use of the electronic receipt system 10.

Thus far, the configurations of preferred embodiments of the present disclosure have been described. However, it is to be noted that these embodiments are merely illustrative examples of the present disclosure and are not intended to limit the present disclosure. It should be easily appreciated by a person skilled in the art that various modifications and changes can be made in accordance with the specific intended use without departing from the spirit of the present disclosure.

In the foregoing embodiments, the present disclosure has been described as a hardware configuration, but the present disclosure is not limited thereto. In the present disclosure, any desired process can also be implemented by causing a CPU (Central Processing Unit) to execute a computer program. In addition, the aforementioned program can be stored with the use of a variety of types of non-transitory computer readable medium and supplied to the computer. The non-transitory computer readable medium includes a variety of types of tangible storage medium. Examples of the non-transitory computer readable medium include a magnetic recording medium (e.g., a flexible disk, a magnetic tape, a hard disk drive), a magneto-optical recording medium (e.g., a magneto-optical disk), a CD-ROM (Read Only Memory), a CD-R, a CD-R/W, and a semiconductor memory (e.g., a mask ROM, a PROM (Programmable ROM), an EPROM (Erasable PROM), a flash ROM, a RAM (Random Access Memory)). In addition, the program may be supplied to the computer in the form of a variety of types of transitory computer readable medium. Examples of the transitory computer readable medium include an electric signal, an optical signal, and an electromagnetic wave. The transitory computer readable medium can provide the program to the computer via a wired communication line, such as an electric wire or an optical fiber, or via a wireless communication line.

A part or all of the embodiments described above can also be expressed as in the following supplementary notes but are not limited to the following.

(Supplementary Note 1)

An information processing apparatus includes:

receiving means for receiving, from a store terminal, information on merchandise purchased by a customer;

storing means for storing at least one of a weight and a volume of the merchandise associated with the customer; and controlling means for causing information including at least one of the weight and the volume of the merchandise purchased within a predetermined period by the customer to be displayed in a terminal device as output information in response to a request from the terminal device.

(Supplementary Note 2)

The information processing apparatus according to Supplementary Note 1, wherein the controlling means causes a plurality of regions to be displayed in the terminal device as the output information, and each region of the plurality of regions includes information on the merchandise purchased by the customer and a total value of at least one of the weight and the volume of the merchandise included in each region of the plurality of regions.

(Supplementary Note 3)

(3) An electronic receipt system according to the present disclosure includes:

a mobile terminal in possession of a customer;

a POS (Point of Sales) device installed at a store; and an electronic receipt center, wherein the POS device generates, as a digitized electronic receipt, receipt information on purchased merchandise purchased by a customer at the store and transmits the electronic receipt to the electronic receipt center, the electronic receipt center stores the received electronic receipt and, upon receiving a transmission request for the electronic receipt from the mobile terminal of the customer, transmits the stored electronic receipt for the customer to the mobile terminal that has made the request, when generating the electronic receipt, the POS device acquires information indicating a weight of the purchased merchandise purchased by the customer and generates the electronic receipt in a format in which the information indicating the weight of the purchased merchandise is further added, and upon receiving the electronic receipt for the customer from the electronic receipt center, the mobile terminal provides a screen display of the information indicating the weight of the purchased merchandise included in the electronic receipt.

(Supplementary Note 4)

The electronic receipt system according to Supplementary Note 3, wherein the POS device, when generating the electronic receipt, generates the electronic receipt in a format in which a unit price and a weight of each individual piece of the purchased merchandise and the number of the individual pieces of the purchased merchandise are grouped together by a store of purchase and by a date of purchase and in which a subtotal purchase price and a subtotal weight totaled by the store of purchase and by the date of purchase are grouped together, and transmits the electronic receipt to the electronic receipt center, and the mobile terminal stores in advance information on a weight of each of a carry-on bag and a cargo-compartment check-in bag held when the customer boards an airplane and information on a weight limit of each of the carry-on bag and the cargo-compartment check-in bag defined by an airplane baggage allowance guideline, upon receiving the electronic receipt for the customer from the electronic receipt center, with regard to the purchased merchandise purchased after a totaling start time set in advance by the customer, provides a screen display in a state in which the purchased merchandise to be stored in the carry-on bag is disposed within a display frame of the carry-on baggage in the form of purchased merchandise icons grouped by the store of purchase and by the date of purchase, and provides a screen display of a weight limit of the carry-on baggage and a carry-on baggage total weight obtained by totaling a weight of the purchased merchandise to be stored in the carry-on bag and a weight of the carry-on bag in a location associated with the display frame, and provides a screen display in a state in which the purchased merchandise to be stored in the cargo-compartment check-in bag is disposed within a display frame of the cargo-compartment check-in bag in the form of purchased merchandise icons grouped by the store of purchase and by the date of purchase, and provides a screen display of a weight limit of the cargo-compartment check-in baggage and a cargo-compartment check-in baggage total weight obtained by totaling a weight of the purchased merchandise to be stored in the cargo-compartment check-in baggage and a weight of the cargo-compartment check-in bag in a location associated with the display frame.

(Supplementary Note 5)

The electronic receipt system according to Supplementary Note 3 or 4, wherein the mobile terminal accepts a tapping or clicking operation of a purchased merchandise icon selected from one or more of the purchased merchandise icons displayed in the display frame of the carry-on baggage or in the display frame of the cargo-compartment check-in baggage and thus displays, in the number of the individual pieces of merchandise, individual merchandise icons indicating one or more types of individual pieces of merchandise constituting the purchased merchandise purchased at the store of purchase and on the date of purchase that correspond to the selected purchased merchandise icon.

(Supplementary Note 6)

The electronic receipt system according to any one of Supplementary Notes 3 to 5, wherein the mobile terminal accepts a drag and drop operation, into the display frame of the cargo-compartment check-in baggage, a purchased merchandise icon or an individual merchandise icon selected from one or more of the purchased merchandise icons or from one or more of the individual merchandise icons displayed in the display frame of the carry-on baggage and thus recalculates and displays the carry-on baggage total weight and the cargo-compartment check-in baggage total weight obtained in a case in which the purchased merchandise or the individual piece of merchandise purchased at the store of purchase and on the date of purchase that correspond to the selected purchased merchandise icon or the selected individual merchandise icon is repacked from the carry-on bag to the cargo-compartment check-in bag, and accepts a drag and drop operation, into the display frame of the carry-on baggage, a purchased merchandise icon or an individual merchandise icon selected from one or more of the purchased merchandise icons or from one or more of the individual merchandise icons displayed in the display frame of the cargo-compartment check-in baggage and thus recalculates and displays the carry-on baggage total weight and the cargo-compartment check-in baggage total weight obtained in a case in which the purchased merchandise or the individual piece of merchandise purchased at the store of purchase and on the date of purchase that correspond to the selected purchased merchandise icon or the selected individual merchandise icon is repacked from the cargo-compartment check-in bag to the carry-on bag.

(Supplementary Note 7)

The electronic receipt system according to any one of Supplementary Notes 3 to 6, wherein the mobile terminal accepts a drag and drop operation, onto an exclude button, of a purchased merchandise icon or an individual merchandise icon selected from one or more of the purchased merchandise icons or from one or more of the individual merchandise icons displayed in the display frame of the carry-on baggage or in the display frame of the cargo-compartment check-in baggage and thus recalculates and displays the carry-on baggage total weight and the cargo-compartment check-in baggage total weight obtained in a case in which the purchased merchandise or the individual piece of merchandise purchased at the store of purchase and on the date of purchase that correspond to the selected purchased merchandise icon or the selected individual merchandise icon is discarded.

(Supplementary Note 8)

The electronic receipt system according to any one of Supplementary Notes 3 to 7, wherein the POS device, when generating the electronic receipt, acquires information indicating a volume of the purchased merchandise purchased by the customer, generates the electronic receipt in a format in which the information indicating the volume is further added, and transmits the electronic receipt to the electronic receipt center, and the mobile terminal further stores information on a volume of each of the carry-on bag and the cargo-compartment check-in bag, and upon receiving the electronic receipt for the customer from the electronic receipt center, with regard to the purchased merchandise purchased after the totaling start time set in advance by the customer, compares the volume of the purchased merchandise to be stored in the carry-on bag or in the cargo-compartment check-in bag with the volume of the carry-on bag or the cargo-compartment check-in bag and, in a case in which the volume of the storing carry-on bag or the storing cargo-compartment check-in bag is smaller, displays a warning screen indicating that the purchased merchandise cannot be stored, or when a drag and drop operation is performed, into the display frame of the cargo-compartment check-in baggage or into the display frame of the carry-on baggage, on a purchased merchandise icon or an individual merchandise icon selected from one or more of the purchased merchandise icons or from one or more of the individual merchandise icons displayed in the display frame of the carry-on baggage or in the display frame of the cargo-compartment check-in baggage, compares the volume of the purchased merchandise to be stored into the cargo-compartment check-in bag or the carry-on bag obtained upon the purchased merchandise or the individual piece of merchandise purchased at the store of purchase and on the date of purchase that correspond to the selected purchased merchandise icon or the selected individual merchandise icon being repacked into the cargo-compartment check-in cargo-compartment check-in bag or the cargo-compartment check-in bag with the volume of the cargo-compartment check-in bag or the carry-on bag and, in a case in which the volume of the storing cargo-compartment check-in bag or the storing carry-on bag is smaller, displays a warning screen indicating that the purchased merchandise or the individual piece of merchandise cannot be repacked.

(Supplementary Note 9)

The electronic receipt system according to any one of Supplementary Notes 3 to 8, wherein the mobile terminal provides a screen display of information on the weight of the purchased merchandise or the individual piece of merchandise purchased at the store of purchase and on the date of purchase that correspond to each of one or more of the purchased merchandise icons or one or more of the individual merchandise icons displayed in the display frame of the carry-on baggage or in the display frame of the cargo-compartment check-in baggage, information on the volume of the purchased merchandise or the individual piece of merchandise, or information on both the weight and the volume of the purchased merchandise or the individual piece of merchandise associated with the purchased merchandise icon or with the individual merchandise icon.

(Supplementary Note 10)

An information terminal of a customer, receives the electronic receipt information from an electronic receipt system, the electronic receipt system includes:

a POS (Point of Sales) device installed at a store; and
an electronic receipt center, wherein when generating, as a digitized electronic receipt, receipt information on purchased merchandise purchased by a customer at the store, the POS device acquires information indicating a weight of the purchased merchandise purchased by the customer, generates the electronic receipt in a format in which the information indicating the weight is further added, transmits the electronic receipt to the electronic receipt center to be stored therein, and thereafter the information terminal receives the electronic receipt for the customer from the electronic receipt center by making an acquisition request for the electronic receipt for the customer to the electronic receipt center and provides a screen display of the information indicating the weight of the purchased merchandise included in the electronic receipt.

(Supplementary Note 11)

A baggage weight checking method with the use of an electronic receipt system to check a weight of purchased merchandise handled as a baggage includes:

a mobile terminal in possession of a customer;
a POS (Point of Sales) device installed at a store; and
an electronic receipt center on a cloud, wherein the POS device generates, as a digitized electronic receipt, receipt information on purchased merchandise purchased by a customer at the store and transmits the electronic receipt to the electronic receipt center, the electronic receipt center stores the received electronic receipt and, upon receiving a transmission request for the electronic receipt from the mobile terminal of the customer, transmits the stored electronic receipt for the customer to the mobile terminal that has made the request, when generating the electronic receipt, the POS device acquires information indicating a weight of the purchased merchandise purchased by the customer and generates the electronic receipt in a format in which the information indicating the weight of the purchased merchandise is further added, and upon receiving the electronic receipt for the customer from the electronic receipt center, the mobile terminal provides a screen display of the information indicating the weight of the purchased merchandise included in the electronic receipt.

(Supplementary Note 12)

A baggage weight checking program is configured to carry out a baggage weight checking method according to Supplementary Note 11 as a program that can be executed by a computer.

REFERENCE SIGNS LIST 1 mobile terminal
2 POS device
3 electronic receipt center
10 electronic receipt system
11 transmission/reception unit
12 display unit
13 input unit
14 electronic money information
15 electronic receipt addressee information
16 memory
17 control unit
18 power source unit
20 store
30 cloud
100 electronic receipt system
102 customer
104 customer device
106 device reader
108 profile information
110 POS component
111 display of information
112 item
114 item price
116 electronic receipt
118 receipt store
120 cloud
122 partial receipt
152 purchased item
154 item price(s)
156 total monetary amount of purchased item
158 payment information
160 physical location
200 PLU table
201 merchandise code
202 merchandise name
203 unit price
204 set weight
300 baggage weight display screen
301 current time
302 totaling start time
303 total weight
304 carry-on baggage
305 cargo-compartment check-in baggage 1
306 cargo-compartment check-in baggage 2
307 "exclude" button
401 name of store of purchase
402 date of purchase
403 time of purchase
404 name of purchased merchandise
405 unit price of purchased merchandise
406 unit weight of purchased merchandise
701 store of purchase information
702 purchased merchandise information
703 monetary amount of purchase information
704 date and time of purchase information
1002 storage component
1004 communication component
1006 processor
1008 customer name
1010 contact address
1012 payment account information
1014 telephone number
1016 IM (Instant Messenger) address
1018 email address
1019 receipt store customer identifier
1020 credit card information
1022 household account information
1024 gift certificate
1026 micropayment structure or lump-sum payment account

The invention claimed is:

1. An information processing apparatus comprising:
hardware, including a processor and a memory;
a receiving unit that is implemented at least by the hardware and that receives, from a store terminal, information on merchandise purchased by a customer;
a storing unit that is implemented at least by the hardware and that stores at least one of a weight and a volume of the merchandise associated with the customer; and a controlling unit that is implemented at least by the hardware and that causes information including at least one of the weight and the volume of the merchandise purchased by the customer to be displayed in a terminal device as output information in response to a request from the terminal device;

the controlling unit causes a plurality of regions to be displayed in the terminal device as the output information, each region of the plurality of regions includes information on the merchandise purchased by the customer and a total value of at least one of the weight and the volume of the merchandise included in each region of the plurality of regions, and the information on the merchandise purchased by the customer is displayed in any one of each region of the plurality of regions in the form of a predetermined icon, and the predetermined icon can be moved between the plurality of regions.

2. The information processing apparatus according to claim 1, wherein the storing unit stores the merchandise purchased by the customer associated with a store of purchase and a date of purchase, and the controlling unit causes the information on the merchandise purchased by the customer to be displayed in the form of the predetermined icon grouped by the store of purchase or grouped by the store of purchase and by the date of purchase.

3. The information processing apparatus according to claim 2, wherein upon an operation of selecting one of the predetermined icons being performed in the terminal device, the controlling unit causes individual merchandise icons indicating one or more types of individual pieces of merchandise included in the predetermined icons to be displayed in the number corresponding to the number of the individual pieces of merchandise, and the individual merchandise icons can be moved between the plurality of regions.

4. The information processing apparatus according to claim 3, wherein the controlling unit updates the output information in response to a movement of the predetermined icon or the individual merchandise icon.

5. The information processing apparatus according to claim 1, wherein the plurality of regions include a first region indicating carry-on baggage carried into an airplane and a second region indicating cargo-compartment check-in baggage checked into the airplane, the first region includes a weight limit or a volume limit of the carry-on baggage, and the second region includes a weight limit or a volume limit of the cargo-compartment check-in baggage.

6. The information processing apparatus according to claim 1, wherein the controlling unit updates the output information upon the information on the merchandise purchased by the customer being deleted from a display screen.

7. The information processing apparatus according to claim 1, wherein in a case in which the total value of at least one of the weight and the volume of the merchandise included in each region of the plurality of regions exceeds a predetermined value set in advance, the controlling unit causes information indicating that the total value has exceeded the predetermined value to be displayed in the terminal device.

8. An information processing method comprising:

a receiving step of receiving, from a store terminal, information on merchandise purchased by a customer in a computer;

a storing step of storing at least one of a weight and a volume of the merchandise purchased by the customer associated with the customer in the computer; and a controlling step of causing information including at least one of the weight and the volume of the merchandise purchased by the customer to be displayed in a terminal device as output information in response to a request from the terminal device in the computer, wherein in the controlling step, a plurality of regions are displayed simultaneously in one screen of the terminal device as the output information, each region of the plurality of regions includes information on the merchandise purchased by the customer and a total value of at least one of the weight and the volume of the merchandise included in each region of the plurality of regions, and in the controlling step, the information on the merchandise purchased by the customer is displayed in any one of each region of the plurality of regions in the form of a predetermined icon, and the predetermined icon can be moved between the plurality of regions.

9. A non-transitory computer readable medium storing a program causes the computer to function as an information processing apparatus configured to execute the information processing method according to claim 8.

10. An electronic receipt system comprising:

the terminal device;

a POS (Point of Sales) device installed at a store; and an electronic receipt center comprising:

hardware, including a processor and a memory;

a receiving unit that is implemented at least by the hardware and that receives, from a store terminal, information on merchandise purchased by a customer;

a storing unit that is implemented at least by the hardware and that stores at least one of a weight and a volume of the merchandise associated with the customer; and a controlling unit that is implemented at least by the hardware and that causes information including at least one of the weight and the volume of the merchandise purchased by the customer to be displayed in a terminal device as output information in response to a request from the terminal device, the controlling unit causes a plurality of regions to be displayed in the terminal device as the output information, each region of the plurality of regions includes information on the merchandise purchased by the customer and a total value of at least one of the weight and the volume of the merchandise included in each region of the plurality of regions, and the information on the merchandise purchased by the customer is displayed in any one of each region of the plurality of regions in the form of a predetermined icon, and the predetermined icon can be moved between the plurality of regions, wherein the POS device generates, as a digitized electronic receipt, receipt information on purchased merchandise purchased by a customer at the store and transmits the electronic receipt to the electronic receipt center, the electronic receipt center stores the received electronic receipt and, upon receiving a transmission request for the electronic receipt from the terminal device of the customer, transmits the stored electronic receipt for the customer to the terminal device that has made the request, when generating the electronic receipt, the POS device acquires information indicating a weight or a volume of the purchased merchandise purchased by the customer and generates the electronic receipt in a format in which the information indicating the weight or the volume of the purchased merchandise is further added, and upon receiving the electronic receipt for the customer from the electronic receipt center, the terminal device provides a screen display of the information indicating the weight or the volume of the purchased merchandise included in the electronic receipt.

* * * * *